United States Patent [19]

Hartmann et al.

[11] Patent Number: 4,510,596
[45] Date of Patent: Apr. 9, 1985

[54] TIME SLOT ASSIGNMENT FACILITIES

[75] Inventors: Philip W. Hartmann, Boulder; Dwight W. Kohs, Broomfield; Douglas A. Spencer, Boulder; Garry V. Turnbow, Northglenn, all of Colo.

[73] Assignee: AT&T Bell Labs, Murray Hill, N.J.

[21] Appl. No.: 433,821

[22] Filed: Oct. 12, 1982

[51] Int. Cl.³ .............................................. H04Q 11/04
[52] U.S. Cl. ........................................................ 370/58
[58] Field of Search ....................... 370/58, 89, 95, 68, 370/79; 179/18 AD

[56] References Cited

U.S. PATENT DOCUMENTS

| | | | |
|---|---|---|---|
| 3,649,763 | 3/1972 | Thompson | 370/68 |
| 3,787,631 | 1/1974 | Lewis | 179/18 AD |
| 3,982,076 | 9/1976 | Hill et al. | 370/58 |
| 4,143,241 | 3/1979 | Aranguren et al. | 370/68 |
| 4,228,536 | 10/1980 | Gueldenpfennig et al. | 370/68 |
| 4,390,982 | 6/1983 | Williams et al. | 179/18 AD |
| 4,432,089 | 2/1984 | Wurzburg et al. | 179/18 AD |

FOREIGN PATENT DOCUMENTS 152904 12/1979 Japan ..................................... 370/95

OTHER PUBLICATIONS

P. Richards, "Technological Evolution—The Making of a Survivable Switching System", 3rd World Telecomm. Forum, Sep. 1979, pp. 1.2.6.1–1.2.6.8

R. Nobis et al, "Switching Systems for Integrated Communication", IEEE NTC 1980, Nov.–Dec. 1980, pp. 68.2.1–68.2.6.

J. Smith, "Controller Chip Handles Voice and Data Switching", Electronics, Sep. 22, 1981, vol. 54, No. 19, pp. 126-130.

"Frame-Mode Customer Access to Local Integrated Voice and Data Digital Networks", *IEEE* 1979 *International Conference on Communications*, Accarino et al., Jul. 1979, pp. 38.5/1-7.

Primary Examiner—Douglas W. Olms
Assistant Examiner—Wellington Chin
Attorney, Agent, or Firm—Donald M. Duft

[57] ABSTRACT

A PCM switching system requires the assignment of either one or two time slots of a pair of time slots to a port circuit depending upon the type of service (voice only or voice plus data) each port circuit provides. Common resources normally assign a pair of time slots to each port circuit. This wastes time slots when the port circuit is used in a manner (voice only service) that requires only a single time slot. The disclosed arrangement eliminates the wasting of time slots by permitting the on-site reconfiguring of the system resources so that, when desired, only a single time slot can be assigned to a port circuit. This is accomplished by the removal of a first type of carrier control board that controls time slot distribution and by the substitution therefore of a second type of control board that applies the first time slot of a pair to its normally assigned port circuit and applies the second time slot of the same pair to another port circuit on the same carrier that also only requires a single time slot. This permits a given system to be configured initially in a first mode and then be subsequently reconfigured on-site so the port circuits of a carrier can each be assigned either one or two time slots. This arrangement avoids the wasting of time slots or costly on-site modifications as service needs change.

30 Claims, 16 Drawing Figures

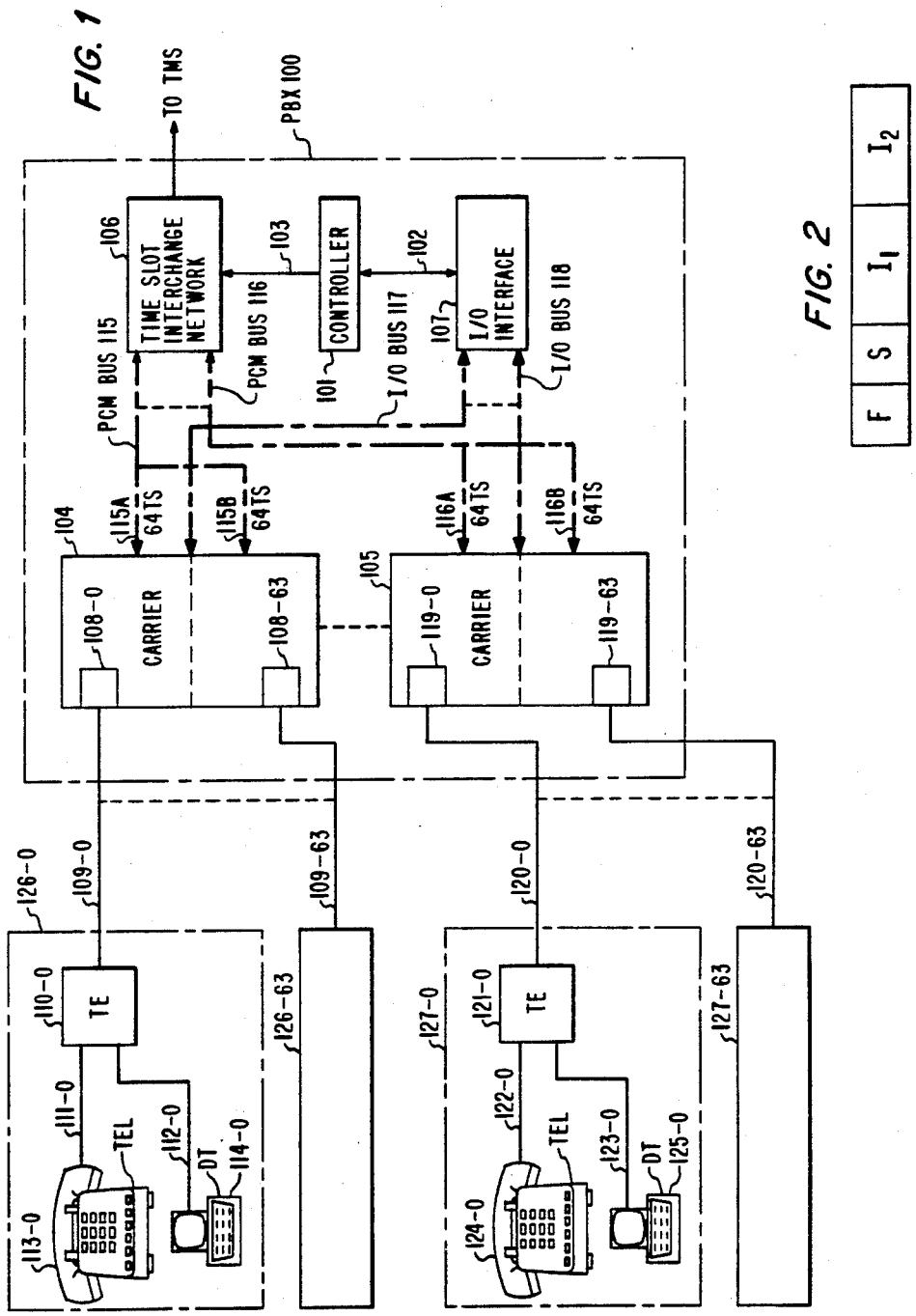

NORMAL MODE
VOICE-DATA

VOICE ONLY

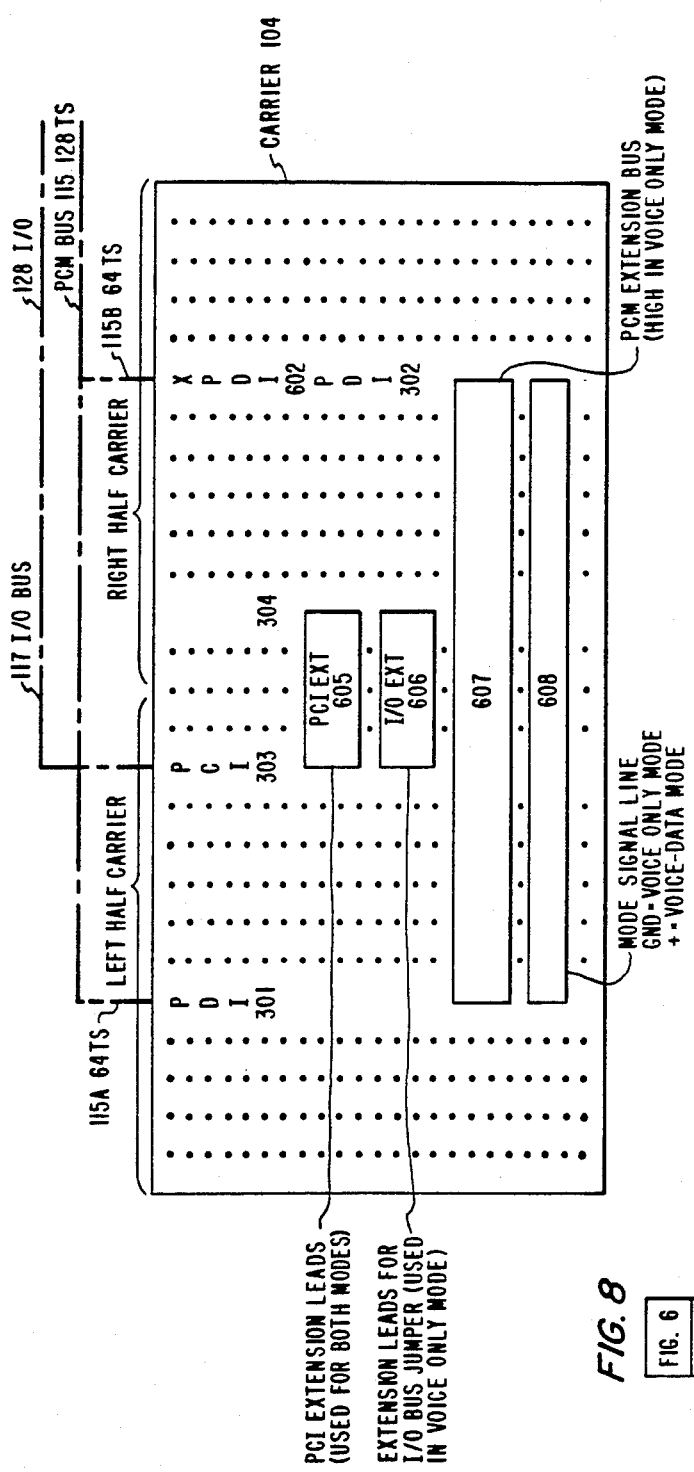

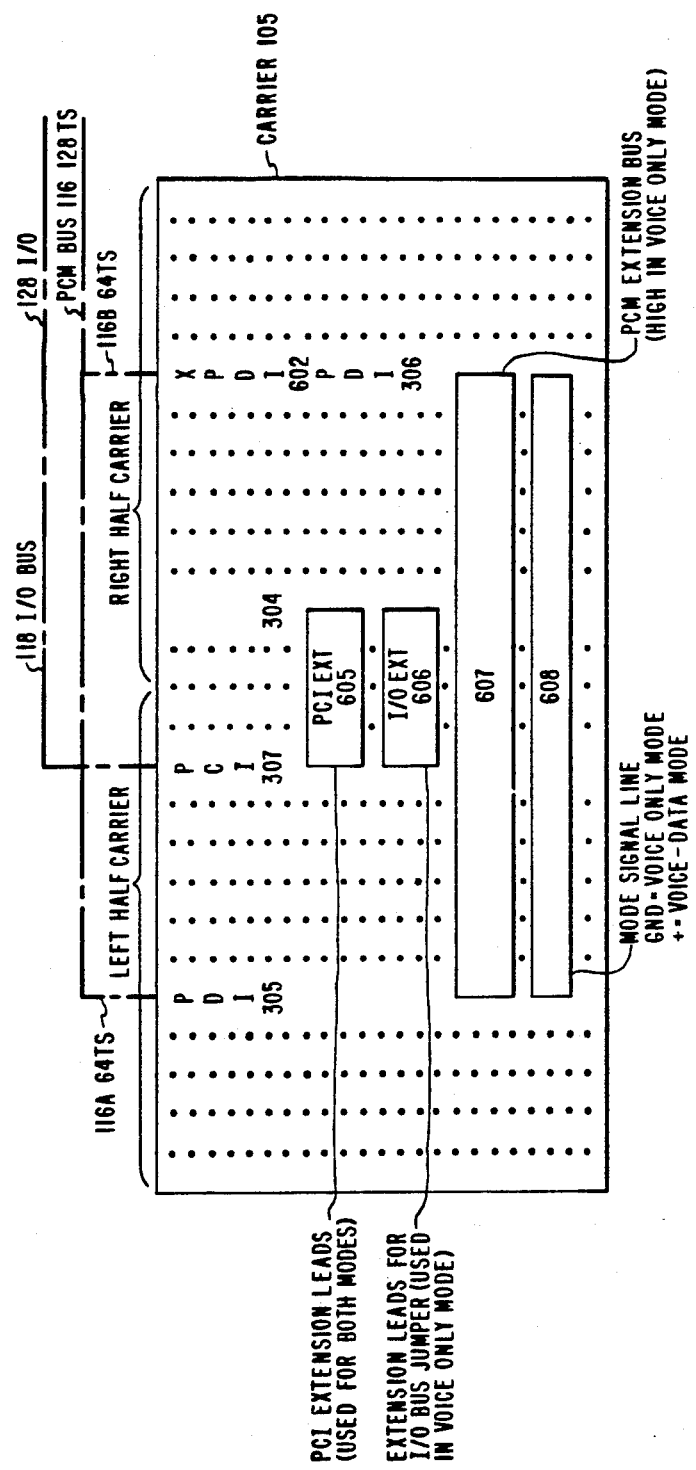

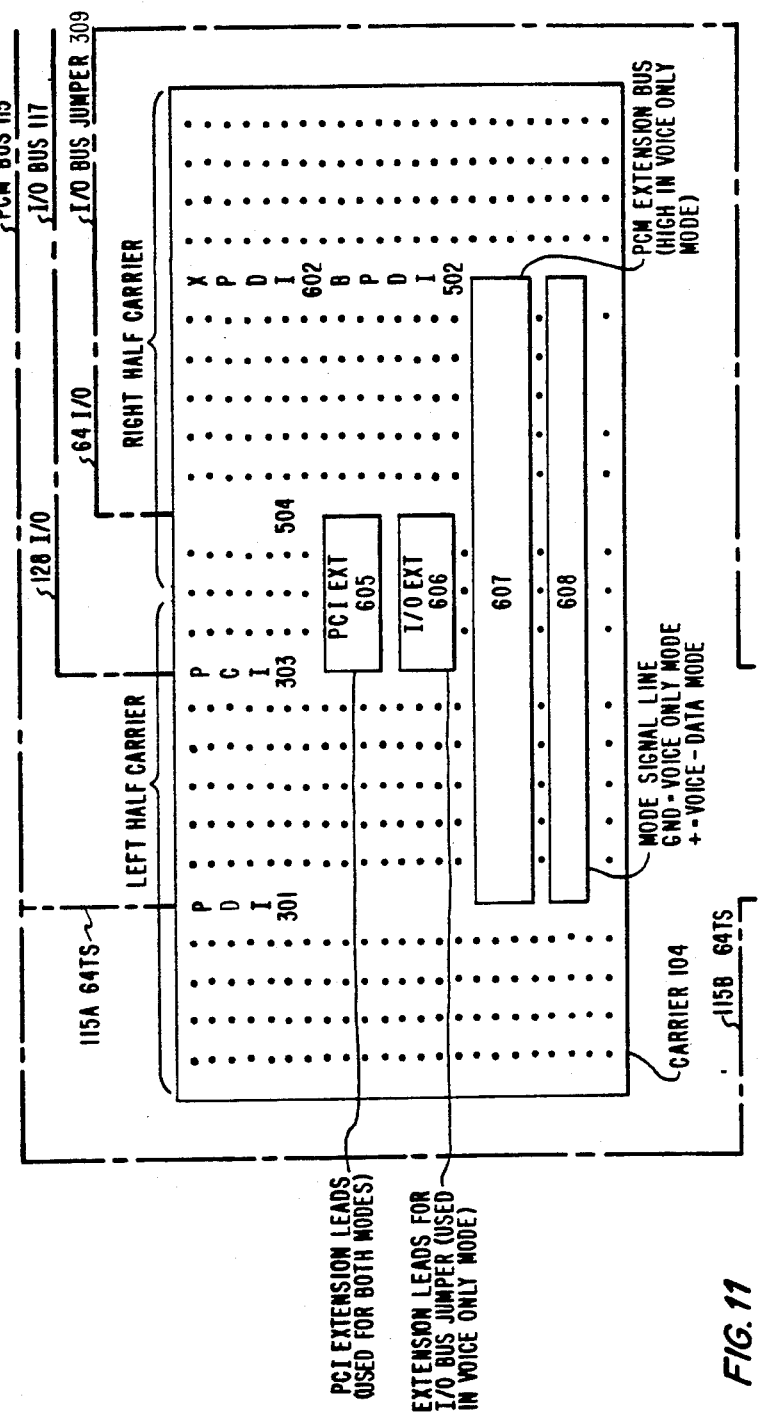

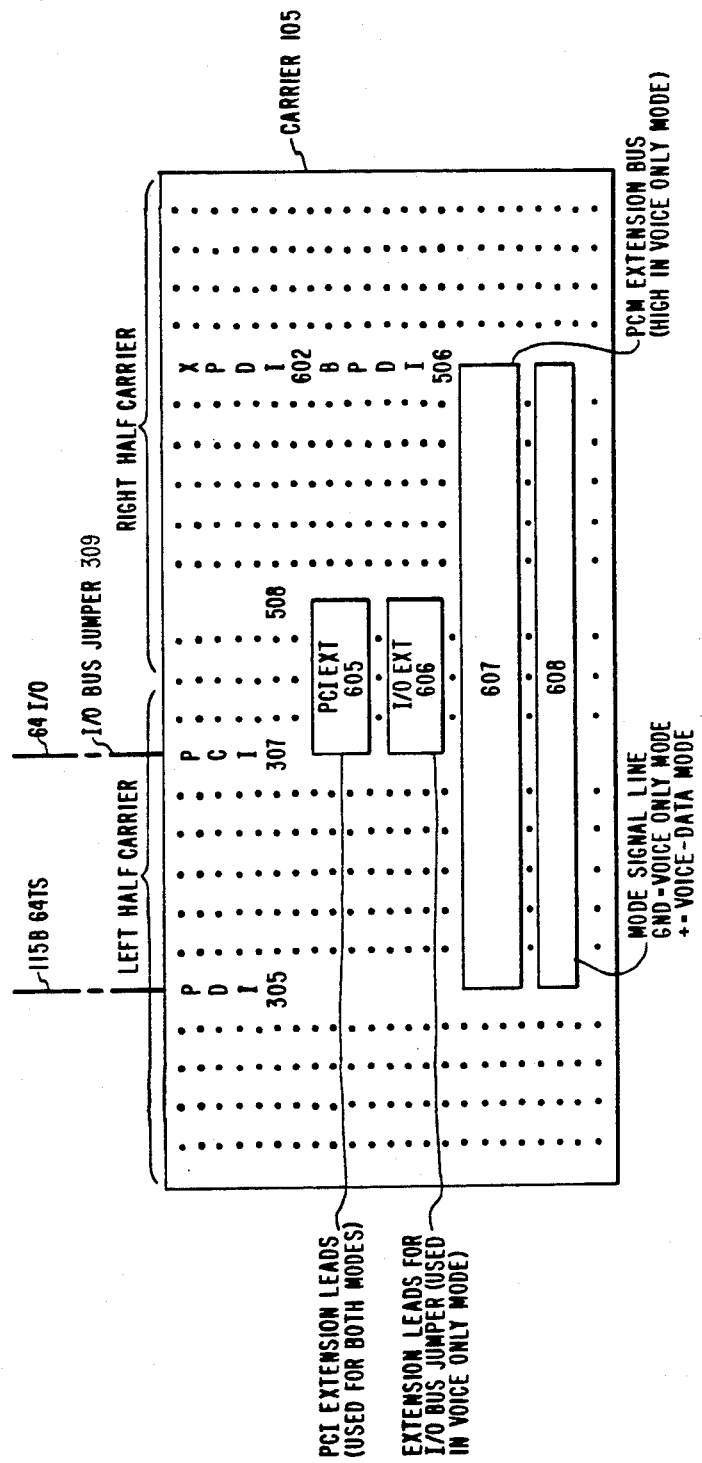

PCI BOARD

PDI BOARD

BPDI BOARD

FIG. 15 PORT I/O CIRCUITRY

PORT PCM CIRCUITRY

TIME SLOT ASSIGNMENT FACILITIES

TECHNICAL FIELD

This invention relates to a switching system and in particular to a time division switching system which provides for an efficient use of system time slots.

BACKGROUND OF THE INVENTION

In electronic time division type switching systems, such as PBXs, the system line or port circuits are mounted on printed wiring boards which, in turn, are inserted into and electrically connected to equipment called a port carrier. The port carriers have slots or recesses into which the boards may be inserted; and contacts at the back of the carrier electrically interconnect backplane wiring of the carrier with cooperating board contacts. With current semiconductor technology, each port circuit is relatively small in size and a plurality of port circuits, typically four (4) or eight (8), are mounted on a single board. Each port circuit is assigned to a different system time slot; and each port circuit serves a call by exchanging signals, during the occurrence of its assigned time slot, with the system's switching network over a network bus as well as with the system's processor or controller via an I/O bus. Each port circuit serves a station device, such as a telephone, over an associated transmission path, such as a tip and ring pair.

A recently proposed system for providing integrated voice and data service, has both a telephone and a data device, such as a terminal, at each station. This is shown in the publication "Frame-Mode Customer Access to Local Integrated Voice and Data Digital Networks," authored by Accarino et al, from the proceedings of the 1979 International Conference on Communications, pages 38.5/1-7. FIGS. 2 and 3 of Accarino et al disclose how a telephone and a terminal at a station can be served over a single transmission path by the use of signals encoded in the frame format shown in FIG. 3 of Accarino et al. Each frame includes two PCM (Pulse Code Modulation) sample fields. One of these fields is associated with a telephone, the other serves a data terminal. The transmission path from each such station terminates at a single port circuit (LTE) of the switching system.

An advantageous way for a single port circuit of a PCM switching system to serve calls from two station devices over a single transmission path using the frame format of FIG. 3 of Accarino et al is to assign two system time slots to each such port circuit. Each of the two assigned PCM system time slots is associated with a different one of the two PCM sample fields of FIG. 3 of Accarino et al. With this arrangement, the "speech" signals from the telephone are received in a first one of the PCM sample fields. The required call connection through the PBX for the speech signals is served during a first one of the two system time slots assigned to the port circuit. The signals generated by the other station services such as a data terminal are received by the port circuit in the other PCM sample field. The required call connection for the data terminal is served during the other time slot assigned to the same port circuit.

PCM type time division switching systems are normally designed so that a fixed number of time slots are applied to a port carrier even though the carrier is capable of accommodating different types of port circuits. A system equipped for receiving station information in a frame format similar to that of FIG. 3 of Accarino and for providing integrated voice-data service may have, for example, 64 port circuits on each carrier. These 64 port circuits may be mounted four per board so that each carrier has 16 port boards. Each of the 64 port circuits on a carrier is assigned to two different system time slots and thus, each carrier receives the 128 PCM time slots and 128 I/O singals required to serve its 64 port circuits so that they can provide a first type of service, such as voice-data service.

A system as above characterized can also provide second type of service, such as voice only service, or data only service by using less complex port circuits mounted so that there are 8 port circuits per board or 128 port circuits per carrier. Each such port circuit requires only a single time slot for the second type of service hereinafter termed voice only service. The system operates in the same manner as above described, insofar as system time slots and carriers are concerned, since each carrier still receives and distributes 128 time slots and I/O signals to the port circuits requiring them.

It is desirable in the operation of time division switching systems that time slots and the I/O buses be used as efficiently as possible in spite of varying customer service demands. In a system equipped for voice only service, time slots and I/O buses are normally efficiently used since a new port carrier would not be added to serve additional stations while there are unused time slots and port circuits on the existing carriers. In other words, even though service demands of the customer may vary for voice only service, these varying demands may be accommodated by adding or removing port circuit boards to the existing carriers as required. A new port carrier would be added only if all port circuits on the port boards of the existing carriers are assigned to existing stations.

The problem of efficient time slot and I/O bus utilization is more complex for systems that receive information from a pair of station devices over a single line in a frame format similar to FIG. 3 of Accarino and provide voice-data service to extend a call connection from the port circuit serving such a line. The system time slots are used efficiently only if each station has both a telephone and a data terminal so that the two time slots assigned to each port circuit are used. A problem arises under circumstances in which service requirements vary to the extent that, at certain times, a large number of stations may have only a single station device, such as only a telephone. Under these conditions all time slots are not efficiently utilized since each port circuit of the voice-data type still has two time slots assigned to it. The problem is aggravated, and can impair efficient service, under conditions in which many such stations are equipped with only a telephone or only a data terminal. This can lead to a situation in which extra carriers will have to be added even though there are unused time slots in existing carriers. In extreme cases, it may be required to add another module and a time multiplex switch to provide acceptable service, even though time slots exist and remain unused in port circuits of the first module.

It is therefore a problem to use time slots efficiently as the customer demands vary in time division switching systems having the capability of providing integrated voice-data service where each port circuit is assigned to two time slots.

SUMMARY OF THE INVENTION

The present invention overcomes the above-discussed problems by providing facilities which permit carriers of a time division switching system, such as a PBX, to be equipped in a first mode to provide a first type of service, such as voice-data, wherein each port circuit requires the use of two time slots. These facilities also permit the carriers to be reconfigured with ease and operated in a second mode to provide a second type of service, such as voice only or data only service, wherein each port circuit requires the use of only a single time slot. The conversion of the carriers from the first to the second mode is easily accomplished and requires no rewiring or rearrangement of either the carrier or the control facilities of the system. The conversion is accomplished by merely rearranging plug terminated PCM and I/O cables between carriers and by removing a first type of control board that is used on each carrier for the first mode and by replacing it with a second type of control board when operating the carriers in the second mode.

The disclosed carriers can accommodate many different types of boards including those having four or eight port circuits per board. In the disclosed exemplary arrangement there are 16 boards per carrier with each board having four port circuits for a total of 64 port circuits per carrier. Each of these port circuits requires the use of two PCM time slots when providing a first type of service termed "voice-data" service. This service requires the carrier to receive 128 PCM time slots. These are distributed by the control boards on each carrier so that each port circuit receives two PCM time slots in the form of two PCM address and associated control signals. Each port circuit also requires the use of a unique I/O signal having an I/O address and associated control signals.

Each carrier is divided into two halves which are connected to a PCM cable having a corresponding first and a second half for voice-data service. Each half of the PCM cable applies 64 PCM addresses and associated control signals to its associated half of the carrier. Each carrier operating in the voice-data mode is also connected to its own I/O cable which supplies 128 different I/O address and associated control signals to the 64 port circuits on the carrier. Only 64 of the 128 I/O address signals are used per carrier for the voice-data mode. The carriers are equipped with a first combination of control boards for voice-data service which apply the 64 PCM time slot signals received by each half to the 32 port circuits on each half of the carrier with each port circuit receiving two time slots. These boards also distribute 64 I/O address signals on the I/O cable to the 64 port circuits on the carrier.

The carriers may alternatively be equipped in accordance with the second mode to provide a second type of service, illustratively termed voice only service, wherein each voice only port circuit requires only a single time slot and a single I/O address. For this service, the plug terminated PCM cables are rearranged so that the two halves of a single PCM cable are connected to two paired carriers with a first half of the cable serving the first paired carrier and with a second half of the cable serving the second paired carrier. Each half of the cable carries 64 PCM time slots. The control boards used for the second mode distribute the received PCM time slots to the 64 port voice only circuits of the carrier on a one time slot per port circuit basis.

A single I/O cable containing 128 I/O addresses serves both of the carriers in the second mode but is connected only to a first one of the paired carriers. The carrier to which the I/O cable is connected receives the 128 I/O signals, distributes 64 of these I/O signals to its 64 port circuits and extends the remaining 64 I/O signals over an I/O bus jumper to the second carrier. The second carrier receives the 64 I/O signals from the first carrier and distributes them to its 64 port circuits.

When a carrier is configured in the first mode to provide voice-data service, each port board on the carrier has a unique ID number (0 through 15) and a port circuit is accessed by concurrently applying to the board a board select signal specifying the board ID number together with an even numbered port address (0,2,4,6) for I/O purposes and an odd or an even port address (0-7) for PCM addressing purposes.

When configured in the second mode to provide voice only type of service wherein only a single time slot per port circuit is used, the port boards on each half of the first carrier of a pair are numbered 0 through 7. The port boards on each half of the second carrier of the pair are numbered 8 through 15. I/O addressing of the ports is accomplished by concurrently generating a board select signal identifying the board on which an addressed circuit is mounted and by generating an even or an odd I/O port address (0-7) which is applied to the control board of the carrier. This board extends the even numbered port addresses (0,2,4,6) to the boards on the left half of the carrier and the odd numbered port addresses (1,3,5,7)to boards on the right half of the carrier after first translating them into even numbered addresses (0,2,4,6). Thus, port circuit 0 on the 0 board of the left half of the first paired carrier is accessed for voice only service by generating a board select signal of 0 and a port address of 0. The board select signal of 0 goes to both the right half board 0 and left half board 0. However, the port address of 0, being an even number, is extended only to the boards on the left half of the carrier to select the port circuit having an address of 0 on board 0 of the left half. The corresponding board and port circuit on the right half of the carrier is accessed for I/O purposes by generating a board select signal of 0, by receiving a port address of 1 from the I/O cable, and by translating this port address of 1 to a 0 by the control board before applying it to port circuit 0 of board 0 on the right side of the carrier.

The second carrier of each pair has board identification numbers 8 through 16 on each half of the carrier and I/O addressing of the port circuits on the port boards of this carrier is accomplished in an analogous manner for voice only service.

PCM addressing of the port circuits for voice only service is accomplished in an analogous manner in the present-invention insofar as concerns the generation of board select signals. Each carrier receives 64 PCM time slot addresses having both even and odd numbered addresses. The 32 even numbered port addresses that are received are distributed to the 32 port circuits on the first half of the carrier. The odd numbered PCM port addresses serve the port circuits on the right half of the carrier. The odd numbered port PCM address signals are received, converted by the control boards to even numbered signals and then extended to the appropriate port circuits on the right half of the carrier.

The control boards of the present invention operate to distribute I/O and PCM signals in accordance with either the first or the second mode of service. For the voice-data mode, each half of the carrier uses a PCM control board wherein each such board serves only its half of the carrier. When the carriers are equipped in the voice only mode, a special PCM control board is inserted into the second half of the carrier. The insertion of this board applies a control signal to a PCM control board on the other half of the carrier. This signal functionally advises the PCM control board on the first half of the carrier that the PCM time slots received by it are to be distributed over both halves of the carrier. The use of the second type of PCM board for the voice only type of service also advises the I/O control board regarding the manner in which the board select signals are to be generated.

In view of the above, it can be seen that the facilities of the present invention permit carriers to operate in different manners so that the carrier port circuits may receive the appropriate control signals including either one or two time slots per port circuit depending upon the mode of service that is to be provided. This is done in a manner involving a minimum of modification and which requires no rewiring of the system or the carriers. Instead, only a rearrangement of plug terminated cables and the substitution of a first type of control boards for a second type is required.

BRIEF DESCRIPTION OF THE DRAWINGS

The invention should become apparent from the following detailed description when taken in conjunction with the accompaying drawings in which;

FIG. 1 discloses a system equipped for voice-data service;

FIG. 2 discloses the signal format between the stations and port circuits of FIG. 1;

FIGS. 6 and 7, when connected as shown in FIG. 8, disclose further details of a carrier equipped for voice-data service;

FIGS. 9 and 10, when arranged as shown in FIG. 11, disclose the details of a carrier arranged for voice only service;

DETAILED DESCRIPTION FIG. 1

Figure 3:
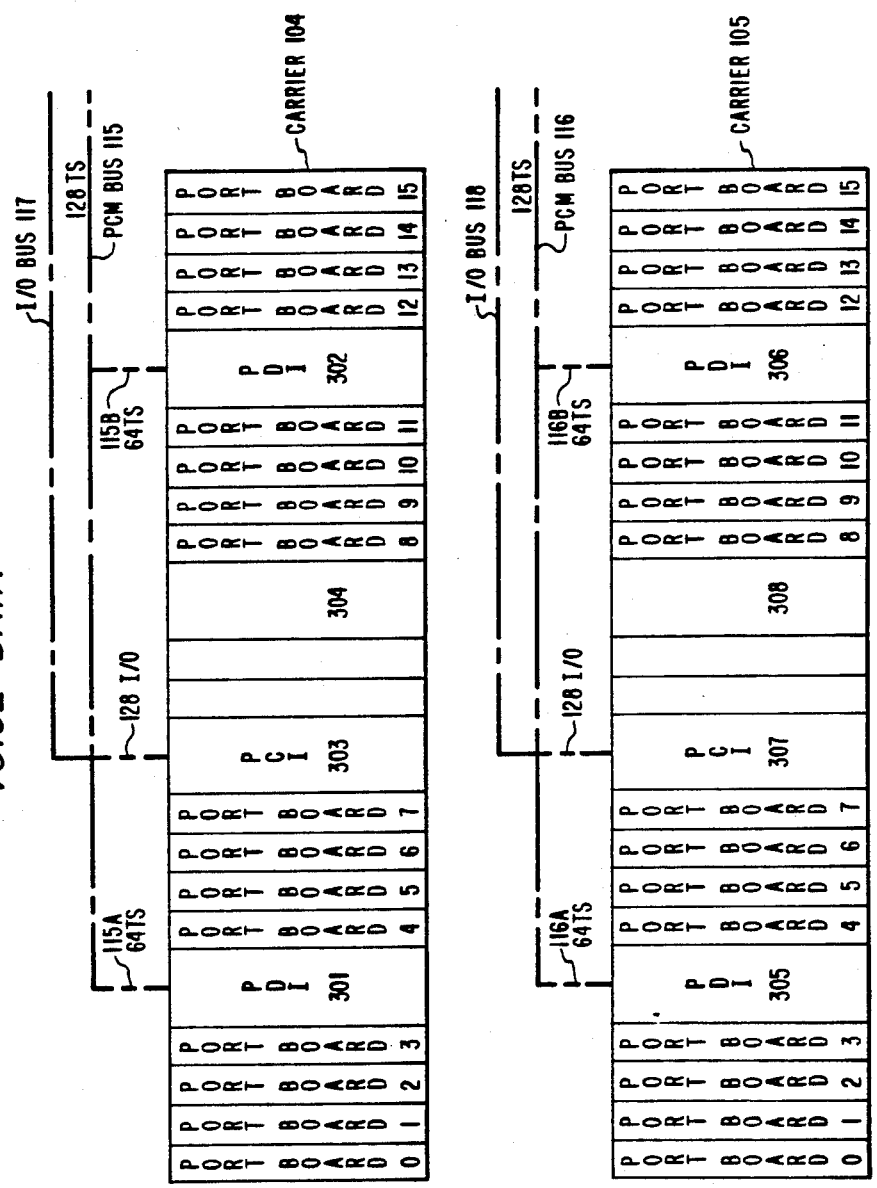
FIG. 3 discloses carrier details for voice-data service.

FIG. 1 illustrates a PCM type PBX switching system configured to provide integrated voice-data service. PBX 100 includes carriers 104 and 105 having port circuits 108 and 119 which are connected over paths 109 and 120, respectively, to subscriber stations 126 and 127, respectively. Each station, such as 126-0, includes terminating equipment 110-0 for terminating path 109-0 and for serving telephone 113-0 and data terminal 114-0 over paths 111-0 and 112-0. Stations 127 are comparably equipped. Port circuits 108 and 119 receive the signals transmitted over paths 109 and 120 from stations 126 and 127 and extend the received signals through the time slot interchange network (TSI) 106 to the other stations involved on each call.

PBX 100 is of the stored program controlled type and includes a controller 101 which comprises processor, memory and control facilities. Controller 101 drives the I/O system of the PBX over path 102 and drives the TSI network 106 over path 103. The I/O system includes I/O interface 107 which is connected via I/O buses 117 and 118 to carriers 104 and 105, respectively. The I/O buses transmit information to the port circuits in the form of I/O commands, addresses, etc. hereinafter referred to as I/O signals. Each I/O signal contains information including the address of a port circuit, such as 108-0, that is to respond to the command. Each I/O signal also contains control information instructing the addressed port circuit to effect a specified circuit action within the port circuit or at the associated station. The I/O signal paths are bidirectional so that the port circuits may also transmit I/O information back to controller 101 via the I/O 117 or 118, I/O interface 107, and path 102.

Controller 101 transmits signals over path 103 to control the time slot interchange network 106. Network 106 applies information, termed PCM time slots, over the PCM buses 115 and 116 to control the port circuits 108 and 119 so that PCM information can be exchanged between the port circuits and the network. During each occurrence of a system time slot associated with a port circuit, network 106 transmits address information and data over PCM bus 115 or 116 specifying the associated port circuit. The port circuit recognizes the arrival of its time slot and exchanges PCM signals over the PCM bus with network 106. For port circuits currently serving calls, these signals represent the current PCM sample of the speech, or other intelligence comprising the subject matter of the call currently being served during that time slot by that port circuit. Network 106 receives this PCM information, temporarily stores it, and applies it over the appropriate PCM bus 115 or 116 to the other port circuit involved on the same call during the system time slot associated with the other port circuit. Information is transmitted in the reverse direction between port circuits in a comparable manner.

All stations 126 and 127 on FIG. 1 are adapted to provide what may be termed "integrated voice-data" service. At station 126-0, telephone 113-0 provides the telephone service and data terminal 114-0 provides the data service. Terminating equipment 110-0 receives the call information from devices 113-0 and 114-0 that is to be transmitted to PBX 100 over path 109-0. Equipment 110-0 converts the information into the frame format of the type shown in FIG. 2 and transmits it over path 109-0 to port circuit 108-0. Information is also transmitted in the reverse direction, and in the same format, from a port circuit to its associated station.

FIG. 2 illustrates the format of the frame by which information is transmitted over paths 109 and 120. The F field contains framing bits which identify the beginning of the frame. The S field represents signaling and station information that is transmitted between a station 126 or 127 and the controller 101 via a port circuit and the I/O system. The two I fields contain the PCM call information exchanged between the PBX 100 and the telephone and data terminal at a station 126 or 127.

The I1 and I2 fields, in essence, represent information for two different calls from a station such as 126-0. The I1 field information from telephone 113-0 is transmitted over path 109-0 and served by the PBX in a first one of the two time slots associated with port circuit 108-0. Information from data terminal 114-0 is transmitted over path 109-0 in the I2 field and is served by port circuit 108-0 during the occurrence of its second assigned time slot. If both telephone 113-0 and data terminal 114-0 at station 126-0 are concurrently busy, port circuit 108-0 concurrently serves both calls. The call information from telephone 113-0 and data terminal 114-0 is extended during their respective time slots by port circuit 108-0 over PCM bus 115 to network 106. The telephone call and the data terminal call may be directed to different destinations under control of the dialed number.

The stations 127 served by carrier 105 are comparably equipped with telephones 124 and data terminals 125 in the same manner as stations 126. This showing is merely exemplary and, if desired, each station 126 or 127 could be equipped with a pair of telephones connected to device TE at the station or, alternatively, with a pair of data terminals each connected to the device TE. Regardless of the nature of the station equipment, be it a telephone and a data terminal, or two telephones, or two terminals, the information associated with one station device is transmitted in the I1 field of FIG. 2; the information generated by the second device is transmitted in the I2 field. The receiving port circuit serves the I1 field information in its first assigned time slot and the I2 field system information in its second assigned time slot.

Carriers 104 and 105 are shown on FIG. 1 as being divided into two halves by the dotted line across the middle portion of each carrier. PCM bus 115 serves carrier 104 and branches into a first bus 115a which supplies 64 PCM time slots to a first half of carrier 104. Bus 115 also branches into a lower bus 115b which supplies 64 PCM time slots to a second half of carrier 104. Similarly, PCM bus 116 carries 128 time slots and serves carrier 105. Its branch 116a carries 64 time slots and serves a first half of carrier 105. Its branch 116b also carries 64 time slots and serves a second half of carrier. The I/O bus 117 applies 128 I/O signals to both halves of carrier 104. Similarly, I/O bus 118 supplies 128 I/O signals to carrier 105.

DETAILED DESCRIPTION FIG. 3

FIG. 3 illustrates further details of carriers 104 and 105 when equipped, as shown on FIG. 1, to provide "voice-data" service. Carrier 104 contains port boards 0–15. Each board has four port circuits with each port circuit being assigned to two unique system time slots. Carrier 104 further contains Port Data Interface (PDI) boards 301 and 302, and a Port Control Interface (PCI) board 303. Carrier 105 is comparably equipped. The functions of the PCI and PDI boards are subsequently described.

PCM buses 115a and 115b apply 64 PCM time slot signals to each of the PDI boards 301 and 302 of carrier 104. PCM buses 116a and 116b apply 64 time slot signals to each of the PDI boards 305 and 306 of carrier 105. PDI board 301 receives the 64 PCM time slot signals from bus 115a and distributes them so that eight unique time slots are applied via the carrier backplane wiring to the four port circuits on each of the port boards 0 through 7 on the left half of carrier 104. PDI board 302 receives 64 time slot signals from bus 115b and distributes eight unique time slots to each of the eight port boards 8 through 15 on the right half of carrier 104. The PDI boards 305 and 306 of carrier 105 function in the same manner to distribute eight PCM time slot signals to each of the port boards they serve.

I/O bus 117 applies 128 I/O signals to PCI board 303 on carrier 104. PCI board 303 applies 64 of the 128 I/O signals it receives to the 32 port circuits on port boards 0 through 7 of the left half of carrier 104; it applies the remaining 64 I/O signals through the carrier backplane wiring and via element 304 to the 32 port circuits on port boards 8 through 15 of the right half of carrier 104. I/O bus 118 applies 128 I/O signals to PCI board 307 of carrier 105. PCI board 307 applies 64 of the 128 I/O signals it receives to the 32 port circuits on port boards 0 through 7 of the left half of carrier 105; it applies the remaining 64 I/O signals through the carrier backplane via element 308 to the 32 port circuits of port boards 8 through 15 of the right half of carrier 105. As later described, the odd numbered I/O addresses on bus 117 and 118 of FIG. 3 are used only for voice only service. They are not used for voice-data service since each port circuit has only an even numbered I/O address. This is subsequently described in detail.

The bus system comprising buses 115, 116, 117, and 118 control the operation of port circuits in their call serving functions. The port circuits time share the buses. Information is transmitted to or received from either the PCM portion or I/O portion of a port circuit by applying the address of the port circuit to one segment of the PCM or I/O bus and by concurrently exchanging information with the port circuit over another other segment of a bus as the port circuit responds to the receipt of its address. For example, there are four port circuits on each port board type shown on FIG. 3. These four port circuits may be identified as port circuits 0, 2, 4, and 6 on each board. However, since each port circuit is assigned two unique system time slots, it is necessary to give each port circuit two different PCM bus addresses. Each PCM address is associated with one of the two time slots associated with the port circuit. With four port circuits to the board and with each port circuit requiring two PCM addresses, port circuit 0 may have addresses of 0 and 1, port circuit 2 has addresses 2 and 3, port circuit 4 has addresses 4 and 5, and port circuit 6 has addresses 6 and 7.

A port circuit is addressed by the PCM bus by applying a board select signal to identify the board on which the port circuit is mounted and by concurrently applying to the appropriate bus conductors the address of the port circuit on the selected port board. Thus, port circuit 0 on port board 0 is addressed by a PDI board by concurrently applying a board select signal to board 0 and a port circuit address of 0 or 1 to all port boards on the half of carrier 104 served by the PDI board. Only port circuit 0 of board 0 responds since only board 0 receives the board select signal.

Each port circuit has only a single I/O port address (an even numbered address). The I/O portion of a port circuit is accessed by applying the assigned I/O address to all boards on its half of the carrier and by concurrently applying a unique board select signal to the board on which the port circuit is mounted.

The PCM buses 115 and 116 are true time shared buses in that the port addresses and board select signals are applied in a defined sequence to a carrier to define system time slots. During each time slot, the port circuit assigned to the time slot exchanges information with the rest of the system via the PCM bus if the port circuit is then serving a call. The I/O bus operates in a similar manner except that the port circuits are not addressed in a specified sequence to defined time slots. Instead, the addresses applied to the I/O bus may be in any random sequence determined by controller 101.

The I/O bus 117 of FIG. 3 can apply I/O signals containing 128 different possible port circuit addresses to carrier 104. I/O bus 118 functions in a similar manner for carrier 105. The voice/data mode of FIG. 3 requires only 64 different I/O port addresses per cable since there are only 64 port circuits per carrier with each port having only a single I/O address. A single I/O port address is used per port circuit even though the port circuit receives two PCM time slots and is connected to a station having both a telephone and a data terminal. The appropriate I/O messages are transmitted selectively to either station device by coding of the I/O message.

With the disclosed arrangement, only the even ones of the 128 I/O port addresses on cable 117 or 118 are used for voice-data service. The odd I/O port addresses are not used for voice data service. Both odd and even I/O addresses are used for voice only service. The system of the present invention is universal and for certain services, not pertinent to this invention, simpler port circuits may be used that can be mounted eight port circuits per board for a total of 128 port circuits per carrier. The 128 I/O port addresses that may be applied by an I/O bus to a carrier are used under those circumstances. All of the 128 I/O port addresses are not used in the disclosed voice data arrangement of FIGS. 1 and 3 since, as already mentioned, a single I/O port address per port together with appropriate encoding of an I/O message is sufficient to control both a telephone and a data terminal for each of the 64 port circuits per carrier. However, as subsequently disclosed, both the even and the odd numbered I/O port addresses are used in the voice only arrangement of the present invention.

DETAILED DESCRIPTION FIG. 4

Figure 4:
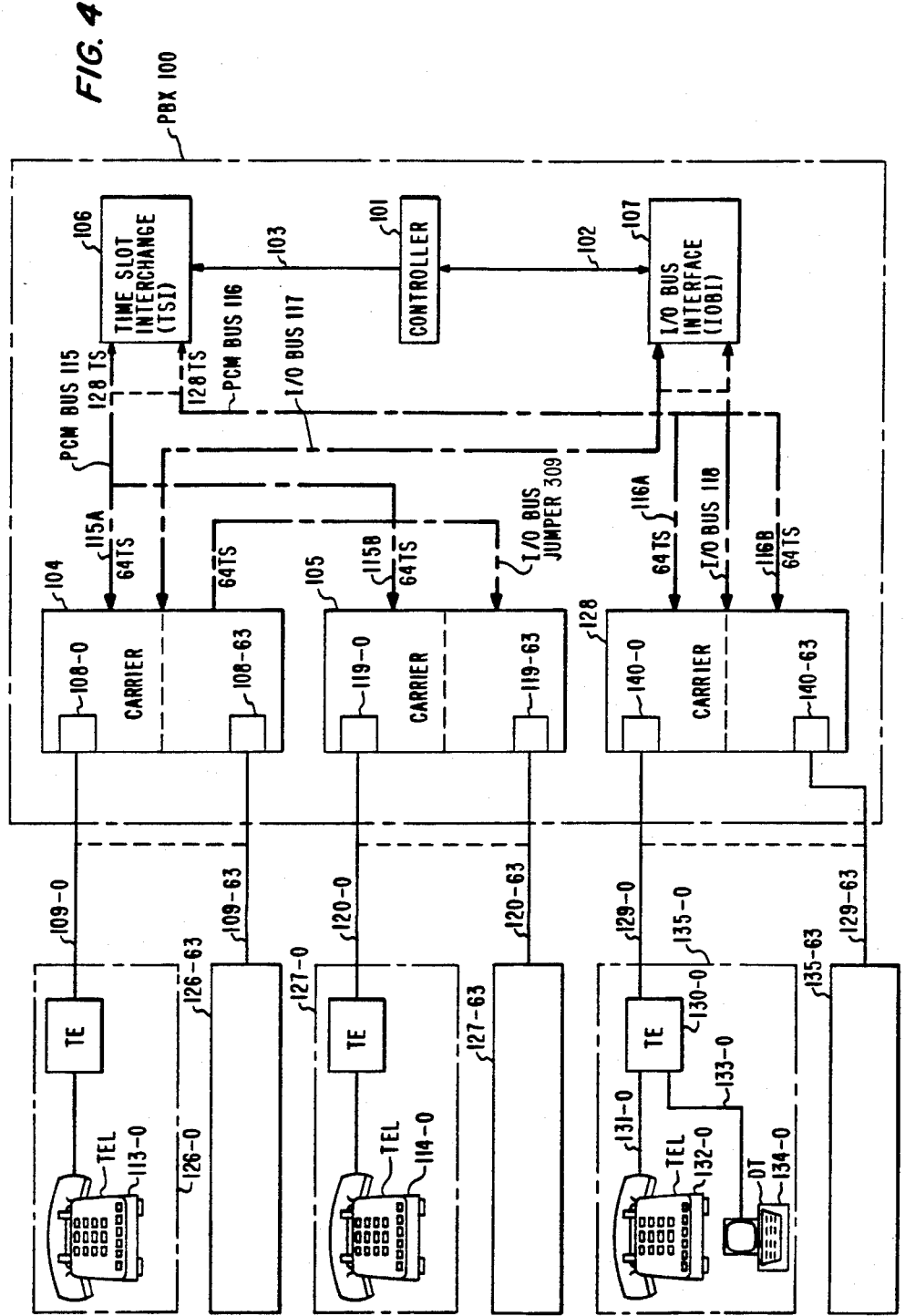
FIG. 4 discloses a system equipped to provide both voice-data and voice only service.

FIG. 4 discloses a system similar to that of FIG. 1 except that it has carriers equipped to provide both integrated voice-data service and voice only service in a manner that makes an efficient use of system time slots. Carrier 128 on FIG. 4 is similar to carrier 104 or 105 of FIG. 1 in that its port circuits 140 are connected over paths 129 to stations 135 having both a telephone 132 and a data terminal 134. This equipment operates in a manner similar to that already described for FIG. 1. Carrier 128 receives 128 PCM time slots over PCM bus 116 which branches into a segment 116a for applying 64 time slots to the first half of the carrier and a segment 116b which applies 64 time slots to the second half of the carrier. Carrier 128 also receives 128 I/O signals from I/O bus interface 103 over bus 118. Of these, only the even numbered port circuit I/O addresses are used by carrier 128.

Carriers 104 and 105 on FIG. 4 are configured for voice only service and are connected over paths 109 and 120 to stations 126 and 127 having only telephones 113 and 114, respectively. Carriers 104 and 105 each receive only 64 PCM time slots rather than the 128 time slots they receive on FIG. 1 for voice-data service. PCM bus 115 carries 128 time slots and branches into a segment 115a which supplies 64 time slots to the entirety of carrier 104 and into a segment 115b which supplies 64 time slots to the entirety of carrier 105. Thus, carries 104 and 105 share PCM bus 115 and the 128 time slots it carries. I/O bus 117 applies 128 I/O signals to carrier 104. By means subsequentially described, carrier 104 uses 64 of these I/O signals and extends the remaining 64 I/O signals to carrier 105 via I/O bus jumper 309. By this means, each of carriers 104 and 105 of FIG. 4 receives 64 I/O signals rather than 128 I/O signals as does carrier 128.

With the cabling arrangement of FIG. 4, carriers 104 and 105 efficiently use the 64 time slots and 64 I/O signals applied to them. Each carrier still contains 16 boards having four port circuits each for a total of 64 port circuits per carrier. However, in the voice only mode, each port circuit only requires a single PCM time slot. Therefore, the application of 64 time slots to the 64 port circuits on each of carriers 104 and 105 constitutes an efficient use of time slots.

DETAILED DESCRIPTION FIG. 5

Figure 5:
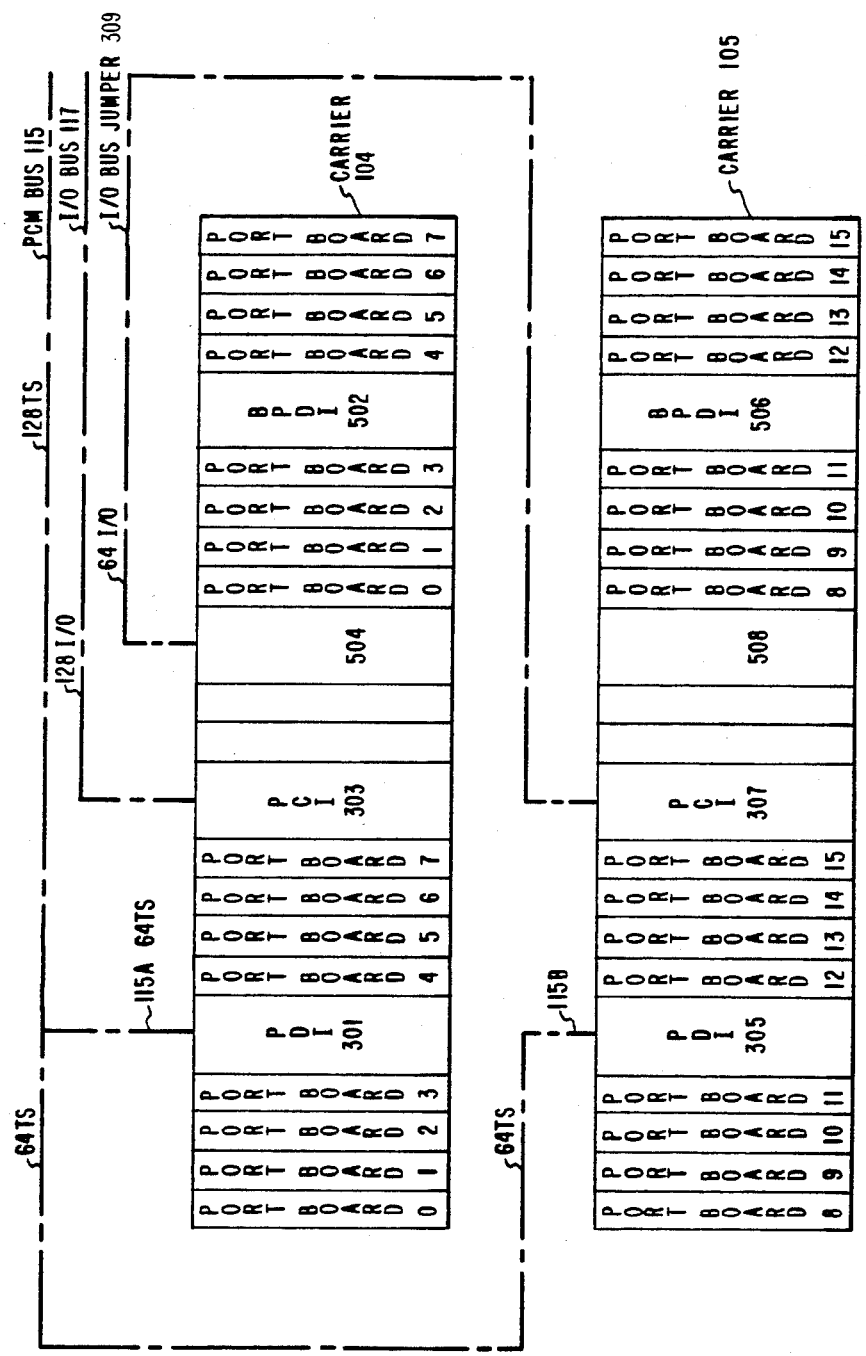
FIG. 5 discloses carrier details for voice only service.

FIG. 5 illustrates further details of carriers 104 and 105 when equipped as shown on FIG. 4 to provide "voice only" type service. Segment 115a of bus 115 applies 64 PCM time slots to PDI board 301 on carrier 104. Segment 115b applies 64 time slots to PDI board 305 on carrier 105. These 64 time slots per carrier are distributed so that each port circuit receives only a single time slot.

I/O bus 117 applies 128 I/O signals to the PCI board 303 on carrier 104. Board 303 distributes 64 of these I/O signals on a one per circuit basis to the 64 port circuits on the 16 port boards of carrier 104. The remaining 64 of the 128 I/O signals are extended from PCI board 303, via element 504, and over bus jumper 309 to PCI board 307 of carrier 105. Board 307 distributes the 64 I/O signals it receives on a one per circuit basis to the 64 port circuits of carrier 105.

The I/O portion of a specific port circuit on either FIG. 3 or FIG. 5 is addressed by concurrently applying the I/O address of the port circuit to the carrier backplane wiring as well as a board select signal indicating the board on which the addressed port circuit is mounted. The port boards on FIG. 3 are numbered 0 through 15 on both carriers. The first port circuit on board 0 of carrier 104 on FIG. 3 is addressed when the I/O bus 117 applies to the PCI board 303 a board select signal of 0 and a port address of 0. The I/O port address of 0 is applied by the PCI board 303 in common to all port boards on carriers 104. However, the board select signal of 0 is applied by the PCI board only to board 0 and therefore, only the first port circuit of board 0 responds to the port address of 0. In a similar manner, the other port circuits of carriers 104 and 105 on FIG. 3 may be addressed. As priorly mentioned, only even numbered port I/O addresses are used for voice-data services. Thus, on FIGS. 1 and 3, only the even numbered addresses in the 128 I/O addresses on bus 117 are used by the port circuits.

In the voice only mode of FIG. 5, each port circuit is mechanically and electrically identical to the port circuit of FIG. 3. However, on FIG. 5 the port boards on both halves of carrier 104 are numbered 0 through 7 while the port boards on each half of carrier 105 are numbered 8 through 15. I/O bus 117 on FIG. 5 receives the same 128 I/O signals as does I/O bus 117 of FIG. 3. But both the even and odd I/O port addresses on bus 117 are used for voice only service per FIGS. 4 and 5. The board select I/O signals 0 through 7 are used by the boards of carrier 104; the board select signals of 8 through 15 applied by bus 117 to PCI board 303 are extended via element 504 and over jumper 309 to PCI board 307 for use by carrier 105.

The PCI board 303 on carrier 104 of FIG. 5 addresses the port boards on both halves of the carrier 104 with board select signals numbered 0 through 7. The port circuits on the left half of the carrier 104 are functionally associated with the even numbered port addresses (0, 2, 4, and 6). The port circuits on the right half of the carrier 104 are functionally associated with the odd numbered port addresses (1, 3, 5, and 7). By this means, the first port circuit on board 0 on the left half of carrier 104 is accessed by a board select signal of 0 and a port address of 0. The PCI board 303 contains the intelligence subsequentially described to route the port address of 0 to only the boards on the left half of the carrier. Thus, only the first port circuit on board 0 on the left half of carrier 104 responds to a board address of 0 and a port address of 0. The first port circuit on board 0 of the right half of the carrier 104 is addressed by a board select signal of 0 and a port address of 1 applied to the PCI board 303. The PCI board 303 contains the intelligence subsequentially described so that the I/O port address of 1 is translated to a 0 and then routed to the port circuits in the right half of the carrier 104.

In a similar manner, PCI board 303 routes other even numbered I/O port addresses to only the ports on the left half of carrier 104. Upon receipt of odd numbered port addresses it converts them to an even numbered port I/O address which is routed to the port circuits on the right half of carrier 104. By this means, the PCI board 303 uses 64 of the I/O signals received over bus 117 to access selectively the 64 port circuits on the boards of carrier 104. The even and odd numbered port addresses in the remaining 64 I/O signals PCI board 303 receives from bus 117 are extended via element 504 and jumper 309 to PCI board 307 of carrier 105. In a manner similar to that described for carrier 104, the even numbered port addresses are routed by board 307 to select the left half carrier 105 port circuits; the odd numbered received port I/O addresses are translated to even numbered I/O addresses and routed to select the right side port circuits of carrier 105. As already mentioned, the port boards of carrier 105 on each half are numbered 8 through 15. Therefore jumper 309 and PCI board 307 apply board select signals numbered 8 through 15 to the boards of carrier 105 to select specified ones of its port circuits.

A port circuit is selected for PCM purposes by applying a unique board select signal to the appropriate board and by concurrently applying the PCM address of the desired port circuit to all boards in common. Only the addressed port circuit on the board primed by the board select signal responds. Each port circuit on FIG. 3 has two PCM addresses, an odd and an even, since each such port circuit is associated with two system time slots when providing voice-data service.

PDI board 301 on FIG. 5 receives 64 PCM time slots from bus segment 115a and applies 32 of these time slots to port boards 0 through 7 of the left half of carrier 104. Each of these port boards receives only four time slots for voice only service and each port circuit on each board requires only a single PCM port address. On FIG. 5, the port circuits on the left side of each carrier are associated with even PCM addresses; those on the right side of each carrier are associated with odd PCM port addresses. PDI board 301 applies the even numbered PCM addresses it receives from cable 115a to the port boards on the left half of carrier 104; it applies the odd numbered PCM port addresses it receives to the port boards on the right half of the carrier after first translating them into even numbered addresses. The PCM port address and PCM board select signals for the right half of the carrier are extended through the backplane wiring of the carrier to BPDI board 502. This board applies the signals it receives on a one PCM address per port circuit basis to each of the 32 port circuits on board 0 through 7 of the right half of carrier 104.

As already mentioned, PDI boards 301 and 305 on FIG. 5 translate the odd numbered port addresses into even numbered addresses before applying them to the port circuits on the right half of the carrier via the BPDI board 502 or 506. This translation is done so that only the circuitry of the port circuit associated with even PCM addresses are used. The other half of the circuitry is not used. This is desirable for administrative reasons so that a single station device at the associated station may be connected in a uniform manner to the terminating equipment thereat. If this were not done and if the single station device was connected to an improper manner at the station, it might be possible to connect it so that its signals would be transmitted to the portion of the port circuit that is associated with the odd PCM addresses that are not used for voice PCM services.

PDI board 305 of carrier 105 on FIG. 5 receives 64 PCM time slots from bus 115b and applies one time slot to each of the 32 port circuits on port boards 8 through 15 of the left half of carrier 105. It applies the remaining 32 time slots through the backplane wiring of carrier 105 to BPDI board 506. BPDI board 506 applies these time slots to the 32 port circuits on port boards 8 through 15 of the right half of carrier 105.

DETAILED DESCRIPTION FIGS. 6 AND 7

FIGS. 6 and 7 illustrate details of the backplane wiring of carriers 104 and 105 equipped to provide voice-data type service. When carriers 104 and 105 are connected in the voice-data mode of FIGS. 1 and 3, PDI board 302 is plugged into slot XPDI 602 on the right half of carrier 104. PCM cables 115a and 115b (each supplying 64 time slots) are connected to PDI boards 301 and 302, respectively. The I/O bus 117 carrying 128 I/O signals is connected to PCI board 303. PDI board 302 applies a high (positive) signal from its internal circuitry to mode signal line 608 at this time. Line 608 interconnects boards 301, 303, and 302. This high signal on line 608 indicates to PDI board 301 and PCI board 303 that the carrier is connected to provide voice-data service. In this mode, tri-state output drivers on PDI board 301 and PDI board 302 that are connected to PCM cable extension bus 607 on the carrier backplane wiring are disabled. When these drivers on PDI board 302 are disabled, PCM data is not transferred over PCM cable extension bus 607 between PDI boards 301 and 302. The PCM data required to serve the 32 port circuits on the right half of carrier 104 is applied by PCM cable 115b to PDI board 302.

I/O bus 117 applies 128 I/O signals for the 64 port carriers of carrier 104 to PCI board 303. A high signal (positive) is also applied over one conductor of the I/O bus 117 to PCI board 303 to indicate that it is connected directly to I/O bus 117 and is not connected to an I/O bus cable extension from another carrier such as I/O bus jumper 309 on FIG. 5 for carrier 105 and its PCI board 307. When PCI board 303 is connected directly to I/O bus 117 and mode signal line 608 is high for the voice-data mode from PDI board 302, PCI board 303 applies 64 of the port addresses and other I/O information it receives to the 32 ports on the eight port boards on the left half of carrier 104. PCI board 303 applies the remaining 64 I/O signals from bus 117 over the backplane PCI extension bus 605 via element 304 to serve the 32 port circuits on the eight boards of the right half of carrier 104. Each port circuit on carrier 104 receives two PCM time slots and two I/O signals as above-described to provide voice-data service. However the odd I/O address signals are not used by the port circuits. Carrier 105 on FIG. 7 is equipped in a similar manner as carrier 104 of FIG. 6 to provide voice-data service.

DETAILED DESCRIPTION FIGS. 9 AND 10

FIGS. 9 and 10 show carriers 104 and 105 equipped to provide voice only service. When a carrier is connected to provide voice only service, a BPDI board 502, rather than a PDI board 302, is plugged into slot XPDI 602 of FIG. 9. PCM cable 115a (supplying 64 time slots) is connected to PDI board 301 of carrier 104. I/O bus cable 117 (carrying 128 I/O signals) is connected to PCI board 303. BPDI board 502 applies a low signal (ground) to mode signal line 608 to indicate to PDI board 301 and PCI board 303 that carrier 104 is configured to provide voice only service. In this mode, tri-state output drivers on PDI board 301 that connect to the PCM extension bus 607 on the backplane wiring are enabled. This permits board 301 to supply PCM information to the right half of the carrier. The PCM data required by both PDI board 301 and BPDI board 502 is supplied by PCM cable 115a connected only to PDI board 301. PCM cable 115b is not connected to carrier 104 as it is on FIG. 6. Instead, it is now connected to the PDI board 305 of carrier 105.

PDI board 301 receives 64 time slots from cable 115a and applies 32 PCM time slots to the 32 port circuits of the eight port boards in the left half of the carrier. It applies 32 PCM time slots over PCM extension element 607 to BPDI board 502 and the 32 port circuits of the eight port boards in the right half of carrier 104. In this mode each port circuit receives a single time slot. In a comparable manner, PDI board 305 receives 64 time slots from cable 115b to serve the 64 port circuits of carrier 105.

I/O bus 117 applies 128 I/O signals to PCI board 303 to serve the 128 port circuits on both carriers 104 and 105. A steady state high signal is also applied over one conductor of the I/O bus 117 to PCI board 303 to indicate that it is connected directly to I/O bus 117 rather than to an I/O bus cable extension 309 as is PCI board 307 of carrier 105 on FIG. 10. With PCI board 303 connected to I/O bus cable 117 and the mode signal line 608 being low from BPDI board 502 to indicate voice only service, PCI board 303 applies 32 I/O signals to the 32 port circuits on the eight port boards (0-7) to the left half of carrier 104; it also applies 32 I/O signals to the 32 port circuits on port boards 0 through 7 on the right half of carrier 104 over the backplane PCI extension bus 605 to element 504.

PCI board 303 also supplies 64 I/O signals to the 64 port circuits on the 16 port boards of carrier 105. These 64 I/O signals are applied over I/O bus extension 606 to element 504 of carrier 104. From there they are applied over I/O bus cable jumper 309 to PCI board 307 on carrier 105. Element 504 also applies a low (ground) signal over I/O bus cable jumper 309 to PCI board 307 on carrier 105. This ground signal indicates to board 307 that it is not connected directly to I/O bus 118 as in FIG. 4 and, instead, that it currently receives I/O signals from I/O bus jumper 309. Carrier 105 uses these I/O signals in conjunction with the 64 PCM time slots received from PCM cable 115b to service its 64 ports in providing voice only service.

DETAILED DESCRIPTION FIG. 12

Figure 12:
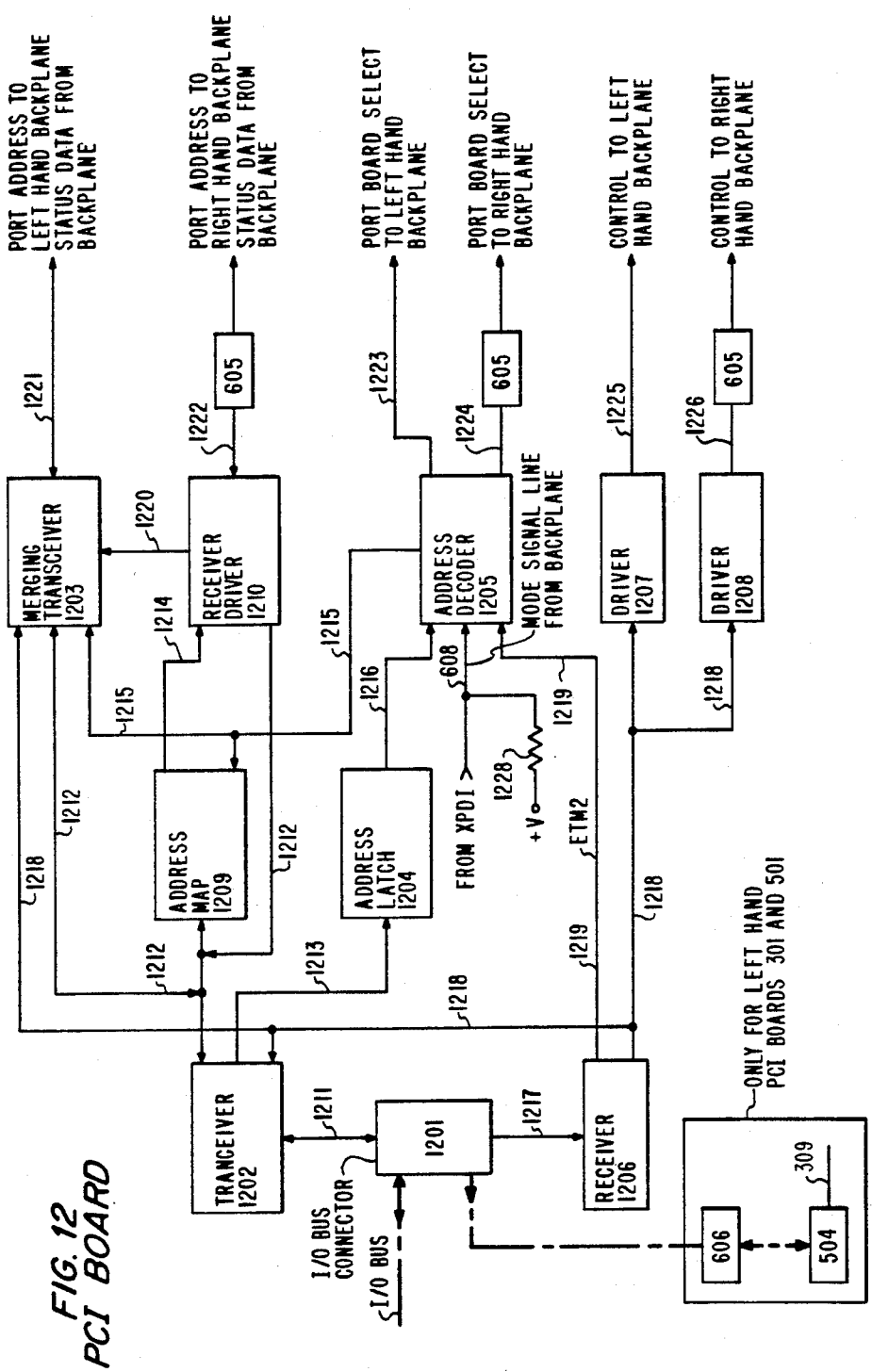
FIG. 12 discloses circuit details of a PCI board.

FIG. 12 illustrates the details of a port control interface (PCI) board such as PCI board 303 of FIG. 9. All PCI boards are identical in operation. They differ only with respect to the I/O buses to which they are connected. One PCI board is used on each carrier to serve all 16 port boards and 64 port circuits on the carrier.

I/O signals containing control signals, port board select address signals, port address signals, and data are applied from either I/O bus 117 or 118 or from I/O jumper 309 to I/O bus connector 1201. For a PCI board, such as board 303 on carrier 104 when equipped for voice only service, these data are also applied from connector 1201 to element 504 and jumper 309 via I/O bus extension leads 606 on the backplane. From there, the information is passed over jumper 309 to the PCI board on carrier 105 equipped for voice only service.

The control information portion of the I/O signals is applied from connector 1201 to receiver 1206 via path 1217. Port address, port board select, and status data in the received I/O signals are applied from connector 1201 to transceiver (XCVR) 1202 over path 1211. XCVR 1202 applies the port address information to merging XCVR 1203, to address map circuit 1209, and to receiver driver 1210 over path 1212. XCVR 1202 applies the port board select data to address latch 1204 over path 1213.

Receiver 1206 applies the control signals it receives to XCVR 1202, merging XCVR 1203, and drivers 1207 and 1208 over path 1218. These control signals are applied to XCVR 1202 and merging XCVR 1203 to set them in either transmit data mode or a receive data mode. In the transmit mode, data are applied from the I/O bus cable via the PCI board to a selected port. In the receive mode, data are applied from a selected port to the I/O bus cable via the PCI board. Driver 1207 applies control signals to the selected ports on the left half of the carrier over path 1225. Driver 1208 applies control signals over path 1226 and over PCI extension 605 to the port boards on the right half of the carrier. These signals indicate to the selected port whether address or data are being currently applied. These signals also set the XCVRs of the port to either the transmit or receive mode.

In the voice only mode, a buffer port data interface (BPDI) board, such as 502, is plugged into the XPDI socket on each carrier as shown on FIGS. 9 and 10. A jumper wire on BPDI board 502 connects mode signal line 608 to ground when a BPDI board is plugged into the XPDI socket 602, to configure the carrier for voice only service. In the voice-data mode, a port data interface (PDI) board 302 is plugged into XPDI socket 602. The mode signal line 608 is not grounded by a PDI board and the mode signal line is held high by pull-up register 1228 connected to +V. The potential on mode signal line 608 is applied to address decoder 1205. This signal advises the decoder whether it is to generate board select signals as shown on FIG. 3 for voice-data service or as shown on FIG. 5 for voice only service.

A signal, termed on ETM2 signal, is applied from the I/O bus cable connector 1201 to receiver 1206 over path 1217, and from the receiver 1206 to address decoder 1205 via path 1219. When the ETM2 signal is high, this indicates to address decoder 1205 that the PCI board is connected directly to an I/O bus cable such as 117. When the ETM2 signal is low, this indicates to address decoder 1205 that the PCI board is connected to element 504 on another carrier such as carrier 105 via I/O bus cable extension 309. This information controls the manner in which the decoder functions to generate board select signals.

VOICE ONLY MODE

When the carrier operates in the voice only mode and the ETM2 signal on a PCI board is high indicating that the PCI board is on carrier 104 and is connected to the I/O bus 117, address decoder 1205 supplies only port board select addresses 0 through 7 on both of its outputs 1223 and 1224. Port board select signals 0 through 7 are applied to the left half of the carrier port boards via path 1223 and over path 1224 and PCI extension element 605 to the port boards on the right half of the carrier.

When the ETM2 signal is low, this indicates that the PCI board is connected to jumper 309 and is on carrier 105. Address decoder 1205 then only supplies port board select addresses 8 through 15 on both of its outputs. Port board select signals 8 through 15 are applied to the left half of the carrier port boards via path 1223, and over path 1224 and through PCI extension 605 to the port boards on the right half of the carrier.

Address decoder 1205 also applies a function-enable signal to address map 1209 and merging XCVR 1203 over path 1215. This signal controls whether port addresses are generated for the voice-data or the voice only mode. Only even port addresses (0, 2, 4, and 6) in the received I/O signals are applied by merging XCVR 1203 to port circuits on the left half of the carrier via path 1221 for the voice only mode. Data are then passed between I/O bus cable 117 and the selected port via path 1221, merging XCVR 1203, path 1212, XCVR 1202, path 1211 and connector 1201. Odd port addresses (1, 3, 5, and 7, which are not used in the voice-data mode) in the received I/O signals are translated into even port addresses by address map 1209 and applied to receiver/driver 1210 via path 1214. These translated port addresses are applied to ports in the right half of the carrier via path 1222 and PCI extension 605. Data is then passed between I/O bus cable 117 and the selected port over the backplane via PCI extension 605, path 1222, receiver/driver 1210 path 1212, XCVR 1202, path 1211, and I/O bus cable connector 1201.

VOICE-DATA MODE

In the voice-data mode, a BPDI board, such as 502 or 506, is not used and the mode signal line 608 is held high by resistor 1228. This causes address decoder 1205 to decode all 16 (0 through 15) available port board select addresses in the received I/O information. It also disables the merging function of merging XCVR 1203 and the mapping function of address map 1209 by applying a function disable signal to these elements over path 1215. Port board select signals 0 through 7 are applied to the left half of the carrier port boards via path 1223. Port board select signals 8 through 15 are applied over path 1224 and PCI extension 605 to the right half ot the carrier port boards.

Merging XCVR 1203 applies the port address for the boards on the left half of the carrier via path 1221. The port address for the boards on the right half of the carrier is applied over path 1212 to address map 1209. Since address map circuit 1209 is disabled by path 1215, the received port address is not changed, but is passed to receiver driver 1210 over path 1214 and applied to the right half of the carrier boards via path 1222 and PCM extension 605. The port address is then decoded on the selected port board specified by decoder 1205 to service the addressed port on the specified board. Data are passed between I/O bus cable 117 and the port boards on the left half of the carrier over path 1221, merging XCVR 1203, path 1212, XCVR 1202 path 1211 and I/O bus cable connector 1201. Data are passed between I/O bus cable 117 and the port boards on the right half of the carrier over path 1222, receiver driver 1210, path 1212, XCVR 1202, path 1211, and I/O bus cable connector 1201.

DETAILED DESCRIPTION FIG. 13

Figure 13:
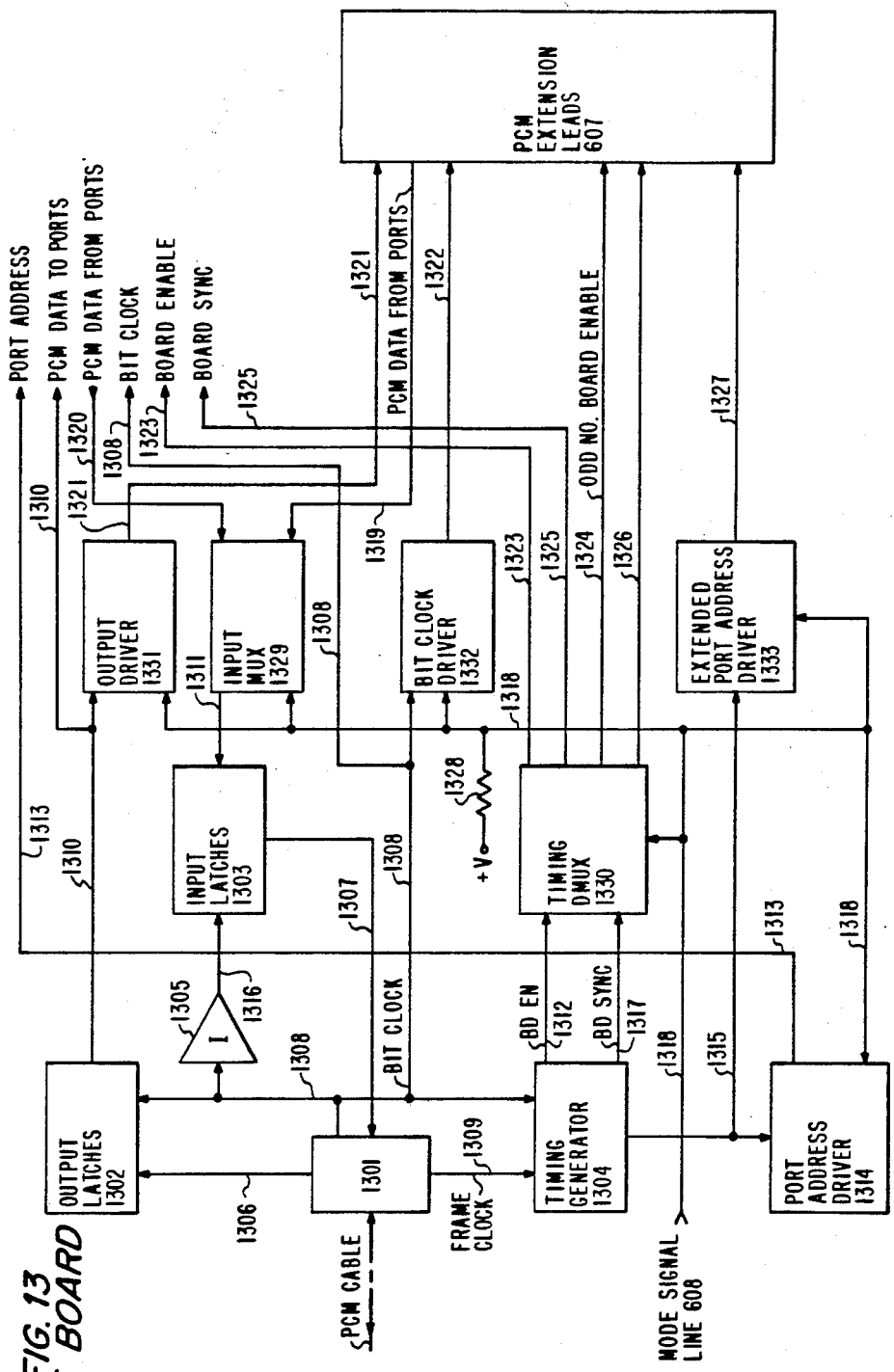
FIG. 13 discloses circuit details of a PDI board.

FIG. 13 illustrates further details of a port data interface (PDI) board. This circuit can function in either the voice only or the voice-data mode.

When connected in the voice only mode (lead 608 grounded), only a single PDI board per carrier is used. This single PDI board is on the left half of the carrier. It allocates one half of the PCM time slots it receives to port boards on the left half of the carrier, and one half to port boards on the right half of the carrier. The PDI board is connected to the left half of the carrier via leads 1313, 1310, 1320, 1308, 1323, and 1325. It is connected to the right half of the carrier via conductors 1321, 1319, 1322, 1324, 1326, 1327 and extension leads 607. In the voice-data mode a separate PDI board is used on each half of the carrier and each board applies all of the time slots it receives to the port boards on its half of the carrier. The extension leads 607 are not then used.

PCM time slots comprising timing signals and PCM data are applied from a PCM cable such as cable 115a or 115b to connector 1301 on the PCI board. The received PCM data are applied from connector 1301 to output latches 1302 over path 1306. PCM data received by the PCI board from the ports are applied from input latches 1303 to PCM cable connector 1301 over path 1307.

In the voice only mode, a buffer port data interface (BPDI) board 502 or 506 rather than a PDI board, is plugged into XPDI socket 602 as shown on FIGS. 9 and 10. BPDI board 502 or 506 grounds the mode signal line 608 when plugged into the XPDI socket 602. In the voice-data mode, a pot data interface (PDI) board 302 or 306 is plugged into XPDI socket 602. The mode signal line 608 is not then grounded and is held high by pull-up resistor 1328 connected to +V. The mode signal line 608 and 1318 on FIG. 13 is connected to pull-up resistor 1328, port address driver 1314, extended port address driver (EPAD) 1333, timing demultiplexor (T-Dmux) 1330, input multiplexor (I-Mux) 1329, output driver 1331, and bit clock driver 1332. This high signal disables the outputs of output driver 1331, bit clock driver 1332, and EPAD 1333. This high also controls I-Mux 1329 and T-Dmux 1330 so that they transfer data only between the PCM cable and the ports on the same side of the carrier as the PDI board. Nothing is then applied by the PDI board to extension leads 607.

The bit clock lead 1308 is applied to timing generator 1304, inverter 1305, output latches 1302, and to the ports over path 1308. The frame clock lead 1309 is applied to timing generator 1304 over path 1309. The bit and frame clocks define the current PCM time slot. There are a plurality of bit clock signals, such as eight, per time slot. Timing generator 1304 determines the port and port board that is to be selected for the currently applied time slot. A port address (0-7) is applied to port address driver 1314 over path 1315. A high signal on path 1318 from mode line 608 for the voice-data mode causes port address driver 1314 to apply both odd and even port addresses via path 1313 to the ports on its side of the carrier over path 1313. This permits any of the eight time slots assigned to each port board to be selected.

Timing generator 1304 applies a board enable signal to T-Dmux 1330 over path 1312. A board select or enable signal is passed through T-Dmux 1330 and applied to the port boards on its side of the carrier over path 1323. The board enable signal prevents unaddressed port boards from placing data on the bus by enabling only the output drivers of the selected port board. The output drivers on all other port boards remain disabled. Timing generator 1304 also applies a board sync signal over path 1317 to T-Dmux 1330. The board sync signal is passed through T-Dmux 1330 and applied to the port board over path 1325. The board sync signal clocks the PCM data in and out of the selected port during the correct time slot.

PCM data are clocked into a selected port when the bit clock signal on path 1308 goes high, and from the selected port into the PDI board when the bit clock goes low. PCM output data are clocked from PCM cable connector 1301 into output latches 1302 when the first bit clock applied over path 1308 goes high. PCM output data are clocked from output latches 1302 to the port over path 1310 when the next bit clock applied to the output latches over path 1308 goes high.

Input PCM data are applied to a PDI board from a selected port on path 1320 to I-Mux 1329. The data are passed through I-Mux 1329 and clocked into input latches 1303 from I-Mux 1329 over path 1311 when the first inverted bit clock applied from inverter 1305 goes high. PCM input data are clocked from input latches 1303 via PCM cable connector 1301 to the PCM bus when the next inverted bit clock goes high. The output from inverter 1305 goes high when each bit clock applied to the inverter over path 1308 goes low.

In the voice only mode, mode signal line 608 is grounded by the BPDI board plugged into XPDI socket 602. This low signal on path 1318 enables output driver 1331, bit clock driver 1332, and EPAD 1333. This ground sets I-Mux 1329 and T-Dmux 1330 to the voice only mode in which they serve port boards on both sides of the carrier.

The bit clock signal on path 1308 is applied to timing generator 1304, inverter 1305, output latches 1302, and to the ports over path 1308. The frame clock on path 1309 is applied to timing generator 1304. The bit and frame clock signals define the current system time slot. Timing generator 1304 determines the port and port board to select for the current system time slot. Both even and odd port addresses are applied by the timing generator 1304 to port address driver 1314 and EPAD 1333 over path 1315. The ground on path 608 for voice only service causes port address driver 1314 to apply only the even numbered port addresses (0, 2, 4, 6) it receives to the left half of the carrier over path 1313. EPAD 1333, with path 608 low, converts the odd numbered port addresses (1, 3, 5, 7) it receives into even numbered port addresses which are then applied to the right half of the carrier via path 1327 and PCM extension leads 607. Only the even numbered port addresses are used for voice only service since the phone at the associated station is always connected so that the I field associated with the even port address is used.

Timing generator 1304 applies a board select or enable signal to T-Dmux 1330 over path 1312. T-Dmux 1330 applies the board enable signal for even numbered ports (0, 2, 4, and 6) to the port boards on the left half of the carrier over path 1323. T-Dmux 1330 applies the board enable signal for odd numbered ports (1, 3, 5, and 7) to BPDI board 502 over path 1324 and PCM extension leads 607. The board enable signal prevents unaddressed ports from placing data on the bus by enabling the output drivers on only the selected port board. The output drivers on all other port boards remain disabled. Timing generator 1304 also applies a board sync signal over path 1317 to T-Dmux 1330. T-Dmux 1330 applies the board sync signal for the even numbered ports to the port boards on the left half of the carrier over path 1325. T-Dmux 1330 applies the board sync signal for the odd numbered ports to BPDI board 602 over path 1326 and PCM extension leads 607. The board sync signal clocks the PCM data in and out of the selected port during the correct time slot.

PCM data are clocked from the PDI board into the port when the bit clock goes high, and from the port to the PDI when the bit clock goes low. PCM data are clocked from PCM cable connector 1301 into output latches 1302 when the first bit clock applied over path 1308 goes high. PCM output data are clocked from output latches 1302 to the selected left hand carrier port and the output driver 1331 over path 1310 when the next bit clock applied to the output latches over path 1308 goes high. The PCM data are applied by output driver 1331 to the right half of the carrier over path 1321 and PCM extension leads 607.

Input PCM data from the left half of the carrier are applied to I-Mux 1329 over path 1320. Input PCM data from the right half of the carrier are applied to I-Mux 1329 from PCM extension leads 607 and path 1319. I-Mux 1329 multiplexes the data from the two halves of the carriers into the correct time slots. The data are clocked into input latches 1303 from I-Mux 1329 over path 1311 when the first bit clock applied from inverter 1305 goes high. PCM input data are clocked from input latches 1303 to PCM cable connector 1301 when the next inverted bit clock goes high. The output from inverter 1305 goes high when each bit clock applied to the inverter over path 1308 goes low.

DETAILED DESCRIPTION FIG. 14

Figure 14:
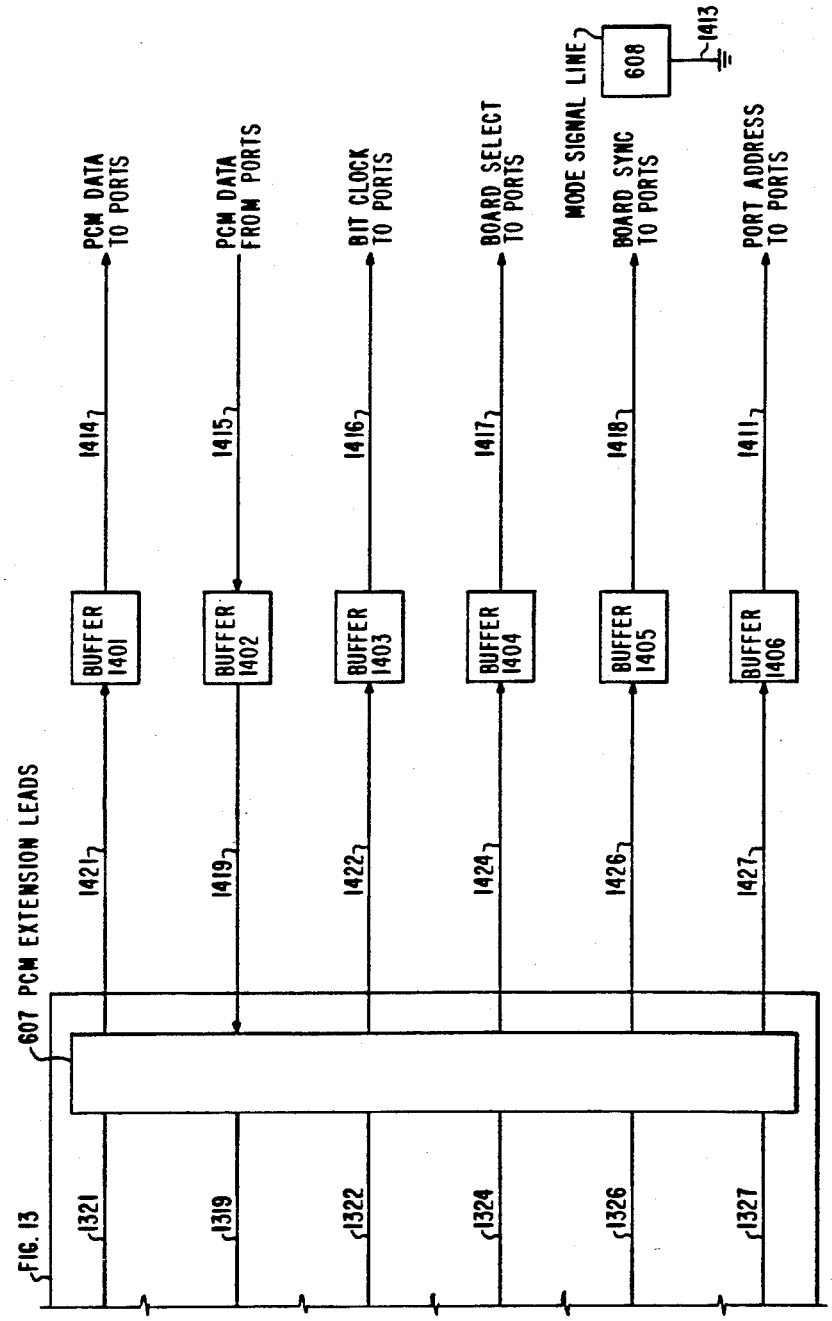
FIG. 14 discloses details of a BPDI board.

FIG. 14 illustrates details of a buffer port data interface board (BPDI). The BPDI board is plugged into XPDI slot 602 when the carrier is configured for the voice only mode. The BPDI board buffers timing signals and PCM data from the PDI board, such as 301 or 305, that is plugged into the left half of the carrier. These signals are applied to the BPDI board over the PCM extension leads 607 to service ports on the right half of the carrier. A ground signal is applied by BPDI board 502 to mode signal line 608 over path 1413. This ground indicates the voice only mode to the PDI and PCI boards. This ground indicates that a BPDI board, and not a PDI board is currently plugged into XPDI socket 602. This ground on path 608 conditions the PDI board of FIG. 13 and the PCI board of FIG. 12 to provide voice only service.

PCM data are applied from PCM extension leads 607 to buffer 1401 over path 1421. Buffer 1401 applies the data to the ports over path 1414. PCM data are applied from the ports to buffer 1402 over path 1415. Buffer 1402 applies the data to PCM extension leads 607 over path 1419. The bit clock signal is applied from PCM extension leads 607 to buffer 1403 over path 1422. Buffer 1403 applies the bit clock signal to the ports over path 1416. Board select signals are applied from PCM extension leads 607 to buffer 1404 over path 1424. Buffer 1404 applies the board select signals to the port boards over path 1417. Board sync signals are applied from PCM extension leads 607 to buffer 1405 over path 1426. Buffer 1405 applies the board sync signals to the port boards over path 1418. Port address signals are applied from PCM extension leads 607 to buffer 1406 over path 1427. Buffer 1406 applies the port addresses to the ports over path 1411. Paths 1414, 1415, 1416, 1417, 1418, and 1411 directly correspond to paths 1310, 1320, 1308, 1323, 1325, and 1313, respectively, on FIG. 16.

DETAILED DESCRIPTION FIG. 15

Figure 15:
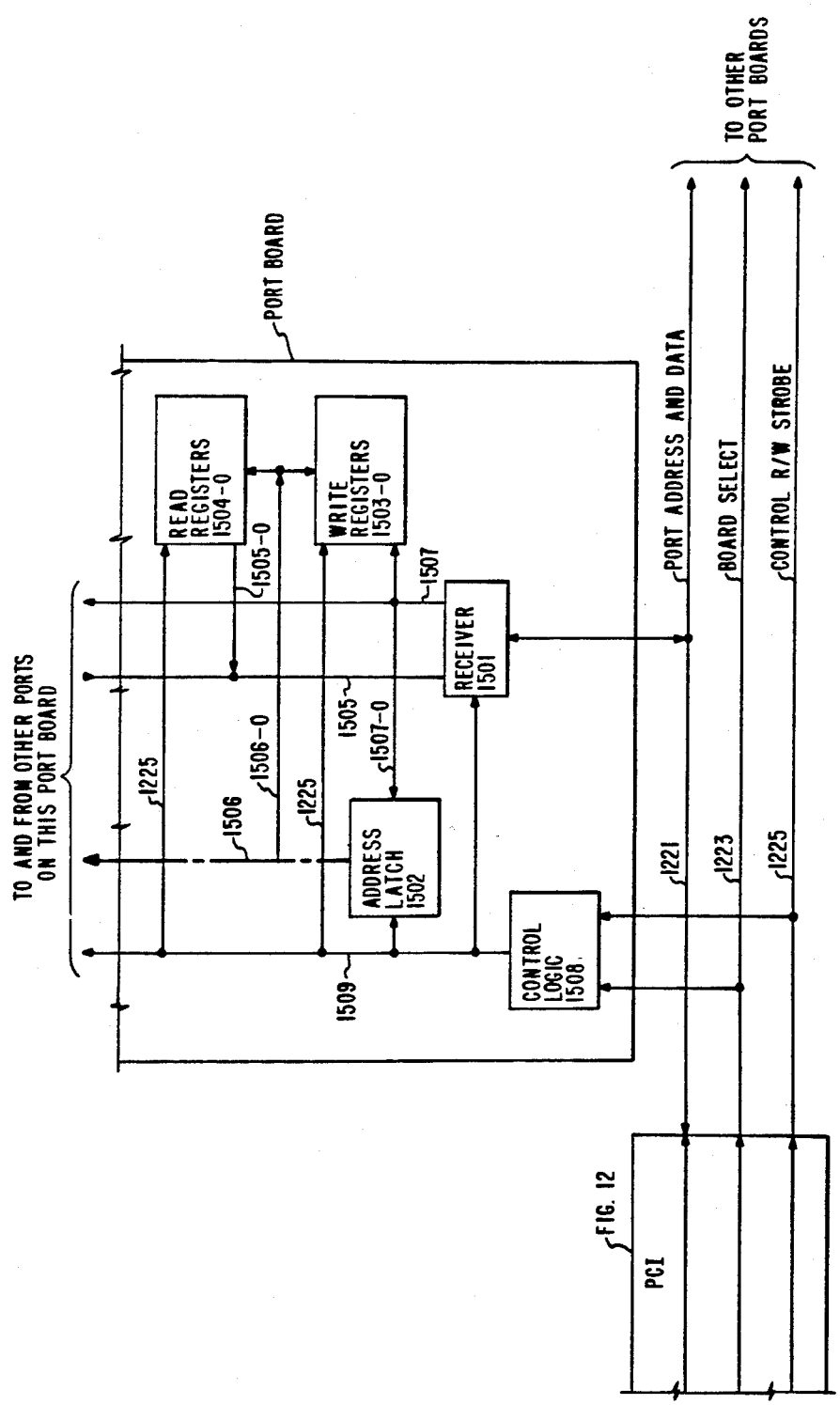
FIG. 15 discloses details of port I/O circuitry.

FIG. 15 discloses the I/O circuitry of the port boards. This circuitry communicates with the PCI board of FIG. 12 via paths 1221, 1223, and 1225. Path 1221 transmits port addresses and data. Path 1223 applies board select signals from the PCI circuit to the port boards. This path comprises a plurality of conductors, each of which is unqiue to a different port board. Path 1225 transmits strobe and control signals such as a read/write signal.

Each port board contains a receiver 1501, control logic 1508 and an address latch 1502 which are provided on a one per port board basis and are common to all port circuits on the board. Each port circuit contains a write register 1503 and a read register 1504 such as write register 1503-0 and read register 1504-0 for port circuit 0. The transmission of information to a port circuit begins when a board select signal from path 1223 is applied to control logic 1508 and a port address from path 1221 are concurrently applied to receiver 1501. The port address portion of the information is applied over path 1507 to the address latch 1502. The address information is latched in when a strobe signal is applied from path 1225, through control logic 1508 and path 1509 to latch 1502. The latch basically comprises a one out of eight decoder and applies a unique gating signal over path 1506 to the read and write registers of the addressed port circuit on the board. Only the read and write registers for port circuit 0 are shown on FIG. 15. A latch signal is applied to port circuit 0 over path 1506-0 to registers 1503-0 and 1504-0. This latch signal permits the write register 1503-0 to receive and register data transmitted to the board over path 1221, through receiver 1501 and to the register on path 1507-0. This same latch signal permits read register 1504-0 to apply information out over path 1505-0, path 1505, via receiver 1501 and path 1221 extending to the PCI board.

As above-mentioned, only the registers for port circuits 0 are shown on FIG. 15. In a comparable manner, receiver 1501 and address latch 1502 can apply gating signals and information to the registers associated with the other circuits on the port board.

DETAILED DESCRIPTION FIG. 16

Figure 16:
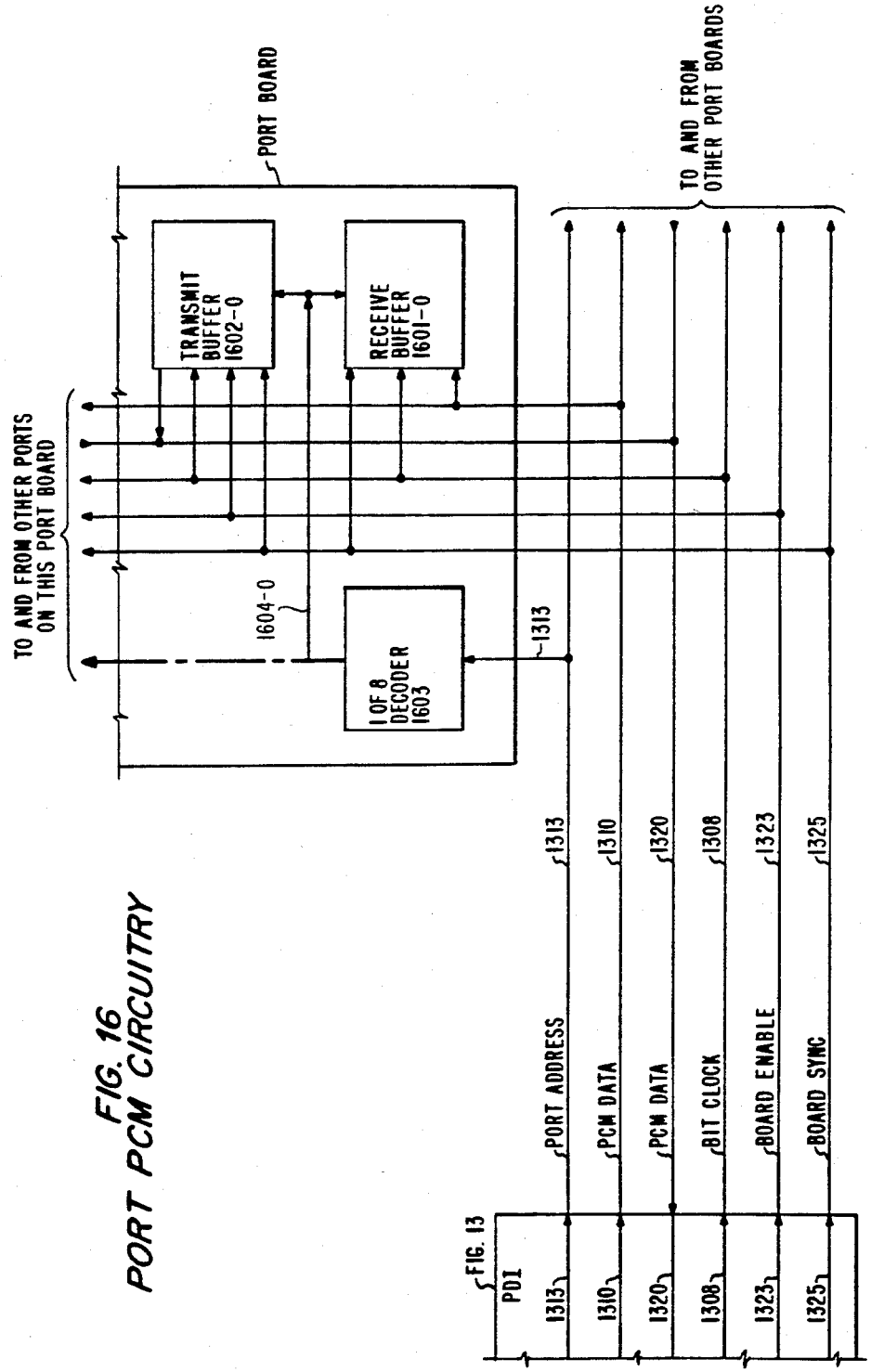
FIG. 16 discloses details of the port PCM circuitry.

FIG. 16 discloses the details of the PCM circuitry on each port board. Each port board contains a one out of eight decoder 1603 common to all port circuits on the board. Each port board also contains a plurality of Xmit buffers 1602 and receive buffers 1601 each of which are unique to a different port circuit. Receive buffer 1601-0 and Xmit buffer 1602-0 are unique to port circuit 0. The vertical lines extend to the corresponding buffers of the other port circuits on the same board.

The circuitry of FIG. 16 receives the indicated information from the PDI board of FIG. 13 over paths 1313, 1310, 1320, 1308, 1323, 1325. The circuitry of a particular board and particular port on the board is accessed when decoder 1603 receives a port address on path 1313. Paths 1323 and 1325 comprises a cable containing a plurality of conductors each of which is unique to a different port board.

The reception of a port address activates decoder 1603 and causes it to provide an output signal extending to the buffers 1601 and 1602 for only one of the port circuits on the board. For example, port circuit 0 is selected when decoder 1603 applies the signal on path 1604-0 to both Xmit buffer 1602-0 and receive buffer 1601-0. At that time, buffer 1601-0 can receive PCM data from path 1310 when a bit clock signal is concurrently received on path 1608 together with a sync signal on path 1325. Also at that time, buffer 1602-0 can transmit PCM data to the PDI board over path 1320 when a board enable signal on path 1323 is concurrently received.

In a similar manner, decoder 1603 can select any of the other port circuits on the board so that their coders and decoders can exchange PCM data with the PDI board.

What is claimed is:

1. In a PCM switching system having a plurality of port circuits and means for controllably establishing communication connections between selected ones of said port circuits, said establishing means including:
   means for generating a plurality of unique time slots in a series of cyclically recurring time slots,
   a first and a second and a third group of M port boards each having N of said port circuits mounted thereon,
   means for providing a first type of communication service by applying N pairs of said time slots to each board of said first group wherein each port circuit on said boards receives a unique pair of said time slots, and
   means for providing a second type of communication service by applying a first time slot of a different unique pair of said time slots to each port circuit on the ones of said port boards comprising a first half of said second and third groups of port boards and for applying the second time slot of each of said last named pairs to different ones of the port circuits on the port boards comprising a second half of said second and third groups of port boards.

2. The system of claim 1 wherein the time slots of each pair are assigned an odd and even time slot number, said system further comprising:
   means effective when providing said second type of service for applying the even numbered time slots to the port circuits comprising said first half, and
   means for extending the odd numbered time slots to the port circuits comprising said second half.

3. The system of claim 2 in combination with means responsive to the receipt of said odd numbered time slots for translating them into even time slot numbers and then applying them to said port circuits comprising said second half.

4. The system of claim 1 in combination with means for connecting each of the port circuits on said first group of port boards to a different pair of station devices.

5. The system of claim 4 wherein one of said station devices of each said pair comprises a data terminal while the other of said devices of each pair comprises a telephone station set.

6. In a PCM switching system having N port circuits mounted on each of a plurality of port boards and means for controllably establishing communication connections between selected ones of said port circuits, said establishing means including:
means for generating a plurality of unique time slots in a series of cyclically recurring time slots,
a pair of port carriers alternatively operable in a first and second mode to provide a first and second type of communication connection service, each carrier having a first and a second half,
means for mounting M port boards on each carrier,
means for operating said carriers in said first mode by applying M×N time slots to each carrier half via separate conductor paths for each half,
a control board on each carrier half for distributing the M×N time slots received by each half to said port circuits on each half wherein each port circuit receives two time slots,
means for alternatively operating said carriers in said second mode by applying M×N time slots to only a first half of each carrier over separate conductor paths for the first half of each carrier, and
means including the control board on each of said first halves of each carrier for applying the received M×N time slots to the port circuits on both halves of each carrier wherein each port circuit receives only a single time slot.

7. The system of claim 6 wherein said last named means comprises means for applying a first time slot of a different unique pair of time slots to each port circuit on a first half of each carrier and for applying the second time slot of each of said last named pairs to different ones of said port circuits on the second half of each carrier.

8. The system of claim 7 wherein the time slots of each pair are assigned an odd and even time slot number and wherein said last named means comprises:
means effective for applying the even numbered time slots to the port circuits on a first half of each carrier and for extending the odd numbered time slots to the port circuits on a second half of each carrier.

9. The system of claim 8 in combination with means responsive to the application of said odd numbered time slots for translating them into even time slot numbers and then applying them to the port circuits comprising said second half.

10. The system of claim 6 in combination with means effective when said carriers are operated in said first mode for connecting each of said port circuits to a pair of station devices.

11. The system of claim 10 wherein one of said station devices of each pair comprises a data terminal while the other of said devices of each pair comprises a telephone station set.

12. The system of claim 6 wherein said means for providing said first type of service comprises:
a port data interface board on each half of each carrier,
means for applying a first control potential to the port data interface boards of each carrier, and
means in said port data interface boards responsive to said first control potential for applying the M×N time slots received over the conductor path for each half to the port circuits of each half wherein each port circuit receives two time slots.

13. The system of claim 12 wherein said means for providing said second type of service comprises:
said port data interface board on a first half of each carrier,
means for applying a second control potential to said port data interface board on said first half of each carrier, and
means in said last named port data interface board of each carrier responsive to said second control potential for applying the M×N time slots received over the conductor path for said first half of each carrier to the M×N port circuits on both halves of said carriers wherein each port circuit receives a single time slot.

14. The system of claim 6 wherein said means for providing said first type of service comprises:
a separate I/O cable extending to each carrier for applying I/O signals containing M×N different I/O addresses each of which is unique to a different port circuit on said carrier, and
a port control interface board on each carrier responsive to the receipt of said I/O signals for extending each received I/O signal to the port circuit specified by the address portion of said signal.

15. The system of claim 6 wherein said means for providing said second type of service comprises:
an I/O cable extending to said first carrier for applying I/O signals containing M×N×2 addresses each of which is unique to a different port circuit of said carriers,
an I/O extension cable extending from said first to said second carrier for applying said received I/O signals to said second carrier,
means including a port control interface board in each carrier for applying the received I/O signals containing even numbered port circuit addresses to an addressed port circuit on said first half of said carriers, and
means in each carrier for applying received I/O signals containing odd numbered port circuit addresses to an addressed port circuit on said second half of said carriers.

16. A method of operating a PCM switching system for controllably establishing communication connections between selected ones of a plurality of port circuits, said system including means for generating a plurality of unique time slots in a series of cyclically recurring time slots, said system further including a first and a second group of port circuits, said method including the steps of:
(1) applying a different unique pair of said time slots to each port circuit of said first group to provide a first type of communication connection service, and
(2) providing a second type of communication connection service by applying a first time slot of a different unique pair of said time slots to each of said port circuits comprising a first half of said second group of port circuits and by applying the second time slot of each of said last named pairs of different ones of the port circuits comprising a second half of said second group of port circuits.

17. The method of claim 16 wherein the time slots of each pair are assigned an odd and even time slot number, said method further comprising the steps of:
(1) applying the even numbered time slots to the port circuits comprising said first half when providing said second type of service and (2) applying the odd numbered time slots to circuitry associated with the port circuits comprising said second half.

18. The method of claim 17 wherein said method further comprises the steps of translating the odd numbered time slots into even numbered time slots and then applying them to the port circuits comprising said second half.

19. The method of claim 16 in combination with the steps of connecting each of the port circuits of said first group to a pair of station devices when providing said first type of service.

20. The method of claim 19 wherein one of said station devices of each pair comprises a data terminal while the other of said station devices of each pair comprises a telephone station set.

21. A method of operating a PCM switching system for controllably establishing communication connections between selected ones of a plurality of port circuits, said system including means for generating a plurality of unique time slots in a series of cyclically recurring time slots, said method including the steps of:
 (1) mounting N port circuits on each of a plurality of port boards,
 (2) mounting M port boards on each of a first and a second and a third carrier,
 (3) applying N pairs of said time slots to each port board of said first carrier over separate conductor paths for each half of said first carrier, wherein each port circuit on said boards of said first carrier receives a different unique pair of said time slots to provide a first type of communication connection service, and
 (4) providing a second type of communication connection service by applying a first time slot of a different pair of said time slots to each of the N port circuits of each board on a first half of said second and third carriers via separate conductor paths for said first half of each of said second and third carriers and by applying the second time slot of each of said last named pairs to a different one of the N port circuits on each board of a second half of said second and third carriers via said separate conductor paths.

22. The method of claim 21 wherein the time slots of each pair are assigned an odd and even time slot number, said method further comprising the steps of:
 (1) applying the even numbered time slots to the port circuits comprising said first half when providing said second type of service, and
 (2) applying the odd numered time slots to circuitry associated with the port circuits comprising said second half when providing said second type of service.

23. The method of claim 22 wherein said method further comprises the steps of translating the odd numbered time slots into even numbered time slots and then applying them to the port circuits comprising said second half.

24. The method of claim 21 in combination with the steps of connecting each of the port circuits on said first carrier to a pair of station devices when providing said first type of service.

25. The method of claim 24 wherein one of said station devices comprises a data terminal while the other of said devices comprises a telephone station set.

26. The method of claim 21 wherein said step for providing said first type of service comprises the steps of:
 (1) applying a first control potential to port data interface boards on each half of said first carrier, and
 (2) operating said port data interface boards upon the receipt of said first control potential for applying the received M×N time slots received over the conductor path for each half to the port circuits of each half wherein each port circuit on said first carrier receives two time slots.

27. The system of claim 26 wherein said step for providing said second type of service comprises the steps of:
 (1) applying a second control potential to a port data interface board on said first half of each of said second and third carriers, and
 (2) operating said port data interface boards in said second and third carriers upon the receipt of said second control potential for applying the M×N time slots received over the conductor path for said first half of each of said second and third carriers to the M×N port circuits on both halves of said second and third carriers wherein each port circuit on said last named carriers receives a single time slot.

28. The method of claim 21 wherein said step for providing said first type of service comprises the steps of:
 (1) extending a separate I/O cable to said first carrier,
 (2) applying I/O signals over said cable containing M×N different addresses each of which is unique to a different port circuit on said first carrier, and
 (3) extending each received I/O signal via a port control interface board on said first carrier to the port circuit specified by an address portion of said I/O signals.

29. The method of claim 21 wherein said step for providing said second type of service comprises the steps of:
 (1) extending a separate I/O cable to said second carrier,
 (2) applying I/O signals over said last named cable containing M×N×2 addresses each of which is unique to a different port circuit on said second and third carriers,
 (3) connecting an I/O extension cable from said second to said third carrier for applying said received I/O signals to said third carrier,
 (4) operating a port control interface board in each of said second and third carriers for applying the received I/O signals containing even numbered port circuit addresses to an addressed port circuit on said first half of said second and third carriers, and
 (5) applying received I/O signals containing odd numbered port circuit addresses to an addressed port circuit on said second half of said second and third carriers.

30. A method of operating a PCM switching system for controllably establishing communication connections between selected ones of a plurality of port circuits, said establishing means including means for generating a plurality of unique time slots in a series of cyclically recurring time slots, said method including the steps of:
 (1) mounting N port circuits on each of a plurality of port boards, (2) mounting M boards on each of a first and a second carrier,
(3) applying N pairs of said time slots to each board of said first and second carriers wherein each port circuit on said boards receives a unique pair of said time slots to provide a first type of communication connection service, and
(4) alternatively providing a second type of communication connection service by applying a first time slot of a different pair of said time slots to each of the N port circuits of each board on a first half of said first and second carriers and applying the second time slot of each of said last named pairs to a different one of the N port circuits on each board of a second half of said carriers.

* * * * *